(12) United States Patent
Wei et al.

(10) Patent No.: US 12,474,449 B2
(45) Date of Patent: Nov. 18, 2025

(54) OPTICAL TRANSMITTING APPARATUS AND ELECTRONIC DEVICE

(71) Applicant: HUAWEI TECHNOLOGIES CO., LTD., Guangdong (CN)

(72) Inventors: Wenxiong Wei, Hangzhou (CN); Fan Wang, Hangzhou (CN); Feng Yu, Hangzhou (CN); Kai Yu, Hangzhou (CN); Chen Qiu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 557 days.

(21) Appl. No.: 17/955,261

(22) Filed: Sep. 28, 2022

(65) Prior Publication Data

US 2023/0026858 A1 Jan. 26, 2023

Related U.S. Application Data

(63) Continuation of application No. PCT/CN2021/079346, filed on Mar. 5, 2021.

(30) Foreign Application Priority Data

Mar. 31, 2020 (CN) .......................... 202010246351.6
Dec. 18, 2020 (CN) .......................... 202011511815.8

(51) Int. Cl.
*H04N 5/225* (2006.01)
*G01S 7/481* (2006.01)
(Continued)

(52) U.S. Cl.
CPC ............ *G01S 7/4815* (2013.01); *G01S 17/89* (2013.01); *G01S 17/894* (2020.01); *H04N 13/207* (2018.05)

(58) Field of Classification Search
CPC .... G01S 7/4815; G01S 7/4817; G01S 7/4816; G01S 17/89; G01S 17/894; H04N 13/207
See application file for complete search history.

(56) References Cited

U.S. PATENT DOCUMENTS 10,571,552 B1\* 2/2020 Gao .................... G02B 26/0816
2007/0133009 A1\* 6/2007 Tang .................. G01B 9/02081
356/512

(Continued)

FOREIGN PATENT DOCUMENTS

CN 101004389 A 7/2007
CN 101055448 A 10/2007
(Continued)

OTHER PUBLICATIONS

Office Action in Chinese Appln. No. 202011511815.8, dated May 24, 2022, 8 pages.
(Continued)

*Primary Examiner* — Sang H Nguyen
(74) *Attorney, Agent, or Firm* — Fish & Richardson P.C.

(57) ABSTRACT

Optical transmitting apparatuses are disclosed. In in an implementation, an apparatus comprises an array light source that includes M*N light sources. An included angle between any column of light sources in the N columns of light sources and any row of light sources in the M rows of light sources is predetermined. The array light source is located on a first side of a collimating lens, a plane on which the array light source is located is perpendicular to an optical axis of the collimating lens, and a distance between the plane on which the array light source is located and a center point of the collimating lens is a focal length of the collimating lens. An rotatable scanning mirror is located on a second (Continued)

side of the collimating lens, and a center point of a reflective surface of the scanning mirror is on the optical axis of the collimating lens.

20 Claims, 15 Drawing Sheets

(51) Int. Cl.
  *G01S 17/89* (2020.01)
  *G01S 17/894* (2020.01)
  *G02B 26/08* (2006.01)
  *G02B 26/10* (2006.01)
  *G02B 27/10* (2006.01)
  *H04N 13/207* (2018.01)

(56) References Cited

U.S. PATENT DOCUMENTS

| | | | | |
|---|---|---|---|---|
| 2010/0014141 | A1* | 1/2010 | Lapchuk | G02B 27/145 |
| | | | | 359/204.2 |
| 2010/0202129 | A1 | 8/2010 | Abu-Ageel | |
| 2013/0038719 | A1* | 2/2013 | Canini | G06K 7/10801 |
| | | | | 348/335 |
| 2014/0307977 | A1* | 10/2014 | Cheng | H04N 23/80 |
| | | | | 382/255 |
| 2016/0352073 | A1 | 12/2016 | Dummer et al. | |
| 2017/0350983 | A1* | 12/2017 | Hall | G01S 7/487 |
| 2018/0167602 | A1* | 6/2018 | Pacala | G02B 5/208 |
| 2018/0202935 | A1* | 7/2018 | Bahlman | G02B 21/0076 |
| 2019/0025426 | A1* | 1/2019 | Satyan | G02B 27/30 |
| 2020/0049979 | A1* | 2/2020 | Brennan | G02B 6/0016 |
| 2020/0090569 | A1* | 3/2020 | Hajati | G09G 3/02 |
| 2021/0157008 | A1* | 5/2021 | Schwarz | G01S 7/4817 |

FOREIGN PATENT DOCUMENTS

| | | |
|---|---|---|
| CN | 104459856 A | 3/2015 |
| CN | 106972347 A | 7/2017 |
| CN | 107078454 A | 8/2017 |
| CN | 108363267 A | 8/2018 |
| CN | 109343034 A | 2/2019 |
| CN | 209297038 U | 8/2019 |
| CN | 110716189 A | 1/2020 |
| CN | 110716190 A | 1/2020 |
| DE | 102017208052 A1 | 11/2018 |
| KR | 101289595 B1 | 7/2013 |
| WO | 2020030916 A1 | 2/2020 |

OTHER PUBLICATIONS

Extended European Search Report in European Appln No. 21780128.1, dated Jul. 28, 2023, 7 pages.

* cited by examiner (a)

(b)

640 columns (a)

(b)

OPTICAL TRANSMITTING APPARATUS AND ELECTRONIC DEVICE

CROSS-REFERENCE TO RELATED APPLICATIONS

This application is a continuation of international Application No. PCT/CN2021/079346, filed on Mar. 5, 2021, which claims priority to Chinese Patent Application No. 202010246351.6, filed on Mar. 31, 2020 and Chinese Patent Application No. 202011511815.8, filed on Dec. 18, 2020. All of the aforementioned patent applications are hereby incorporated by reference in their entireties.

TECHNICAL FIELD

Embodiments of this application relate to the field of optical and electronic device technologies, and in particular, to an optical transmitting apparatus and an electronic device.

BACKGROUND

When a three-dimensional (3D) camera (also referred to as a depth camera) photographs a target object, not only a two-dimensional image of the target object (for example, a face) can be obtained, but also depth information of the target object can be obtained. The depth information of the target object includes a distance between each feature of the target object and the camera, and may represent a three-dimensional feature of the target object. Based on this, the 3D camera may implement functions such as facial recognition and three-dimensional map reconstruction by using the two-dimensional image and the depth information that are of the target object photographed by the 3D camera.

The 3D camera includes a transmit end and a receive end. The 3D camera may obtain the depth information of the target object in the following manner. The transmit end is configured to emit light, and the light emitted by the transmit end is projected onto the target object and reflected by the target object. The receive end may receive light reflected by the target object. The 3D camera may calculate the depth information of the target object based on a time difference between a time point at which the transmit end emits the light and a time point at which the receive end receives the light reflected by the target object.

Currently, the transmit end of the 3D camera emits the light in a spot scanning manner. For example, FIG. 1 is a schematic diagram of a structure of a transmit end based on a spot scanning technology. As shown in FIG. 1, the transmit end includes a light source 110 and a scanning mirror 120, and the scanning mirror 120 includes a reflector 121. The light source may emit a light beam 1, the light beam 1 is irradiated to the reflector 121 on the scanning mirror 120 and is reflected by the reflector 121 as a light beam 2, and the light beam 2 may be irradiated to a target object. In the transmit end shown in FIG. 1, a propagation direction of the light beam 1 emitted by the light source 110 remains unchanged. The reflector 121 may rotate in a horizontal direction and a vertical direction, to adjust an included angle between the reflector 121 and the light beam 1 (namely, an incident angle of the light beam 1 on the reflector 121). When the incident angle of the light beam 1 on the reflector 121 changes, an exit angle of the light beam 2 changes accordingly. In other words, the transmit end may control, by adjusting the reflector 121, the exit angle of the light beam 2 to change, to emit light (namely, the reflected light beam 2) in the spot scanning manner.

The reflector 121 needs to be adjusted for a plurality of times in the horizontal direction and the vertical direction, so that the transmit end that uses the spot scanning manner can emit light at different angles, and the receive end can capture an image of the target object. For example, when the 3D camera is used to scan a video graphics array (video graphics array, VGA) image (an image with a default resolution of 640*480), at least 9 million points need to be collected per second. In other words, the reflector 121 needs be adjusted for at least 9 million times. In addition, when the reflector 121 is adjusted, an angle of the scanning mirror needs to be adjusted in the horizontal direction and the vertical direction. Therefore, a requirement on the rotation angle of the scanning mirror is high, and a requirement on a modulation speed of the light source 110 is extremely high. Therefore, the spot scanning manner has the high requirement on the rotation angle of the scanning mirror, and is difficult to implement. In addition, the light source is projected onto a point of the target object, and the corresponding receive end can collect only one pixel. For example, the light beam of the trans t end needs to be irradiated to the target object for 640*480 times, so that the receive end can capture a complete VGA image. In the spot scanning manner, utilization of the light source is low.

SUMMARY

This application provides an optical transmitting apparatus and an electronic device, to reduce requirements on a rotation angle of a rotatable scanning mirror in the optical transmitting apparatus, and improve utilization of a light beam emitted by the optical transmitting apparatus.

To achieve the foregoing technical objectives, the following technical solutions are used in this application.

According to a first aspect, this application provides an optical transmitting apparatus. The optical transmitting apparatus may include an array light source, a collimating lens, a rotatable scanning mirror, and an optical beam splitter. The array light source may include M×N light sources, the M×N light sources are light sources in M rows and N columns, and both M and N are positive integers. A spacing between two adjacent columns of light sources in the N columns of light sources is a first preset distance, a spacing between two adjacent rows of light sources in the M rows of light sources is a second preset distance, and an included angle between any column of light sources in the N columns of light sources and any row of light sources in the M rows of light sources is a preset angle.

The array light source may emit K light beams, where $K \geq 1$, and K is a positive integer. The array light source is located on a first side of the collimating lens, a plane on which the array light source is located is perpendicular to an optical axis of the collimating lens, and a distance between the plane on which the array light source is located and a center point of the collimating lens is a focal length of the collimating lens. The collimating lens may convert the K light beams emitted by the array light source into K first collimated light beams.

The rotatable scanning mirror is located on a second side of the collimating lens, the rotatable scanning mirror is configured to implement one-dimensional rotation, and a center point of a reflective surface of the rotatable scanning mirror s on the optical axis of the collimating lens. The reflective surface is configured to reflect the K first collimated light beams into K second collimated light beams. When the rotatable scanning mirror implements one-dimensional rotation, one array may be projected each time.

Scanning can be completed through projection for a plurality of times, and a predetermined resolution is implemented.

The optical beam splitter is configured to: receive the K second collimated light beams, and split the K second collimated light beams into i×K third collimated light beams, where and i≥2, and i is a positive integer.

In one aspect, the optical transmitting apparatus includes the array light source including the M×N light sources. The array light source may include the M rows of light sources and the N columns of light sources, or include N rows of light sources and M columns of light sources. The array light source may emit the K light beams, where K≥1. Compared with a spot scanning manner, in this manner, a two-dimensional light beam array may be formed when the rotatable scanning mirror rotates in one direction. Requirements on a rotation angle of the rotatable scanning mirror are reduced.

In another aspect, the optical beam splitter in the optical transmitting apparatus may split one light beam into i light beams, so that a quantity of light beams projected by the optical transmitting apparatus increases. Each light beam is projected onto a target object, and the light beam corresponds to a point of the target object. In other words, after one light beam in the optical transmitting apparatus is split into the i light beams, the i light beams correspond to i points of the target object. Compared with the spot scanning manner, the optical transmitting apparatus in this application improves utilization of the light source. In addition, one light source emits one light beam, and the one light beam may be split into i light beams. It is assumed that each light beam corresponds to one pixel, in other words, each light source may correspond to i pixels. When light sources are disposed, the light sources do not need to be closely arranged. Processing difficulty and installation difficulty of the light sources are reduced.

In conclusion, processing difficulty and installation difficulty of the array light source in the optical transmitting apparatus provided in this application are low, the array light source is easy to implement, and utilization of the light source by the optical transmitting apparatus is improved.

In a possible implementation, the optical beam splitter may include at least one of a one-dimensional grating, a two-dimensional diffractive optical element, and a prism film. In other words, the optical beam splitter may be the one-dimensional grating, the two-dimensional diffractive optical element, or the prism film; or may include the foregoing two elements. For example, the optical beam splitter may be a combination of the one-dimensional grating and the prism film.

In another possible implementation, a preset angle of the included angle between the any column of light sources in the N columns of light sources and the any row of light sources in the M rows of light sources is an acute angle.

In another possible implementation, when the optical beam splitter is the prism an incident surface of the optical beam splitter is a plane, and an exit surface of the optical beam splitter is of a prism film structure. The prism film structure includes i light beam splitting surfaces, the i beam splitting surfaces are configured to split one light beam into i light beams, and the i light beams have different propagation directions.

It may be understood that the prism film structure is an optical film having a micro prism structure on a surface. In other words, the prism film structure is an optical film having a micro prism on the surface. The micro prism on the surface of the prism film structure may split one light beam into i light beams, so that the optical beam splitter can split one light beam into i light beams.

In another possible implementation, when the optical beam splitter is the two-dimensional diffractive optical element, the two-dimensional diffractive optical element is configured to split one light beam into a light beam matrix including i light beams.

In another possible implementation, when the optical beam splitter is the one-dimensional grating, the one-dimensional grating element may split one light beam into i light beams. When the i light beams are projected onto a same plane, a connection line between transmittance points of the light beams is a straight line.

In another possible implementation, the light sources in the array light source may include an edge light emitting semiconductor laser, a vertical-cavity surface-emitting laser (Vertical-Cavity Surface-Emitting Laser, VCSEL), a fiber laser, or a solid state laser.

A light beam emitted by a light source in the array light source may be of any wavelength. Any light source in the array light source may emit a light beam, or any column or any row of light sources in the array light source may emit light beams.

In another possible implementation, the optical transmitting apparatus further includes a controller, and the controller is connected to the rotatable scanning mirror. The controller is configured to: receive a control signal, and transmit the control signal to the rotatable scanning mirror. The control signal indicates the rotatable scanning mirror to adjust an angle of the reflective surface on the rotatable scanning mirror. The rotatable scanning mirror is configured to receive the control signal, and adjust the angle of the reflective surface based on the control signal, to adjust propagation directions of the K second collimated light beams.

In another possible implementation, the rotatable scanning mirror includes a micro-electro-mechanical systems MEMS reflector or a digital micromirror device DMD.

According to a second aspect, this application further provides an electronic device, including the optical transmitting apparatus in the first aspect and any possible implementation of the first aspect. A light beam emitted by the optical transmitting apparatus is irradiated on a target object and reflected by the target object. The electronic device further includes a receiving apparatus, configured to receive a light beam reflected by the target object.

In a possible implementation, the receiving apparatus includes a receiving lens and an image sensor. An optical axis of the receiving lens is perpendicular to a plane on which the image sensor is located. The receiving lens is configured to receive the light beam reflected by the target object, and refract the light beam reflected by the target object into a refracted light beam. The refracted light beam is irradiated on the image sensor, so that the target object is imaged on the image sensor.

In another possible implementation, a distance between the image sensor and the receiving lens is less than twice a focal length of the receiving lens.

In another possible implementation, a pixel of the image sensor is E×F, and both E and F are positive integers. The image sensor includes j detectors, j is less than E×F, and j is a positive integer.

A quantity of detectors in the image sensor is less than a quantity of pixels, and an image of a corresponding resolution can be formed on the image sensor. In other words, the quantity of detectors in the image sensor may be reduced, and costs are reduced.

In another possible implementation, the detector includes at least one single-photon detector.

In another possible implementation, the receiving apparatus further includes an optical filter, the optical filter is disposed between the receiving lens and the image sensor, and the optical filter is parallel to the plane on which the image sensor is located. The optical filter is configured to filter out ambient light in the refracted light beam.

According to a third aspect, this application further provides a light beam emitting method. The method may be applied to the optical transmitting apparatus in the first aspect and any possible implementation of the first aspect. The optical transmitting apparatus includes an array light source, a collimating lens, a rotatable scanning mirror, an optical beam splitter, and a processor. The array light source includes M×N light sources, the M×N light sources are light sources in M rows and N columns, and both M and N are positive integers. A spacing between two adjacent columns of light sources in the N columns of light sources is a first preset distance, a spacing between two adjacent rows of light sources in the M rows of light sources is a second preset distance, and an included angle between any column of light sources in the N columns of light sources and any row of light sources in the M rows of light sources is a preset angle. The method may include: The processor controls the array light source to emit K light beams, where K≥1, and K is a positive integer. The array light source is located on a first side of the collimating lens, a plane on which the array light source is located is perpendicular to an optical axis of the collimating lens, and a distance between the plane on which the array light source is located and a center point of the collimating lens is a focal length of the collimating lens. In this case, the K light beams emitted by the array light source may be propagated to the collimating lens, and the K light beams are converted into K first collimated light beams by using the collimating lens. The rotatable scanning mirror is located on a second side of the collimating lens, the rotatable scanning mirror is configured to implement one-dimensional rotation, and the optical axis of the collimating lens passes through a reflective surface of the rotatable scanning mirror. The K first collimated light beams converted from the collimated light beams may be propagated to the rotatable scanning mirror. The processor controls the rotatable scanning mirror to reflect the K first collimated light beams into K second collimated light beams. The K second collimated light beams are split into i×K third collimated light beams by using the optical beam splitter, and the i×K third collimated light beams are emitted, where i≥2, and i is a positive integer.

In a possible implementation, the preset angle is an acute angle.

According to a fourth aspect, an embodiment of this application further provides a computer-readable storage medium, including computer instructions. When the computer instructions are run on the electronic device according to the first aspect and any possible implementation of the first aspect, the electronic device may implement the light beam emitting method in the third aspect.

It may be understood that, for beneficial effects that can be achieved by the electronic device in the second aspect, the light beam emitting method in the third aspect, and the computer-readable storage medium in the fourth aspect provided above, refer to beneficial effects in the first aspect and any possible implementation of the first aspect. Details are not described herein again.

DESCRIPTION OF EMBODIMENTS

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of embodiments, unless otherwise specified, "a plurality of" means two or more.

The following explains terms that may appear in embodiments of this application.

Diffractive optical element (diffractive optical element, DOE) is also referred to as a binary optical device. The diffractive optical element has specific surface structure design, so that a light beam propagated to the diffractive optical element is diffracted.

Figure 1:
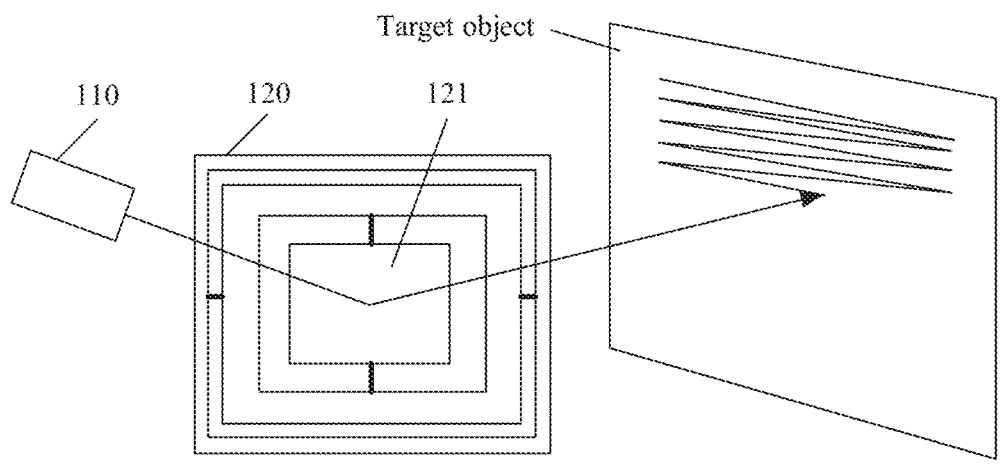
FIG. 1 is a schematic diagram of a structure of a transmit end in a spot scanning manner according to this application.
Figure 2:
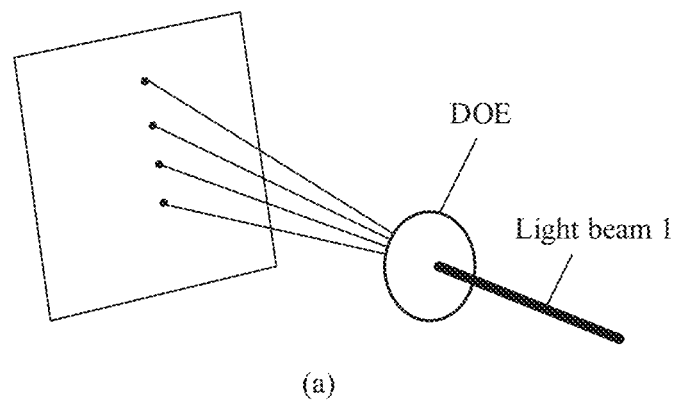
FIG. 2 is a schematic diagram of a structure of a diffractive optical element according to an embodiment of this application.
Figure 2:
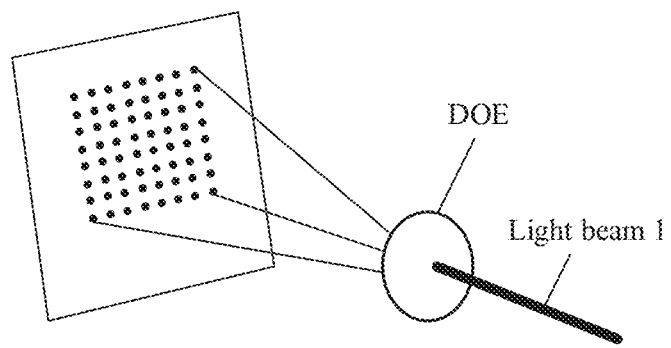

Specifically, functions of the diffractive optical element vary with different surface structures of the diffractive optical element. A DOE used in this application may have a one-dimensional spot array light beam splitting function, and may further have a two-dimensional spot array light beam splitting function. The DOE having the one-dimensional spot array light beam splitting function may split one light beam into a plurality of light beams in one direction. For example, as shown (a) in FIG. 2, a light beam 1 is divided into four light beams by the DOE in a vertical direction. The DOE having the two-dimensional spot array light beam splitting function may split one light beam into one matrix light beam. For example, as shown (b) in FIG. 2, the light beam 1 is split by the DOE into an 8*8 light beam array.

Collimation: Generally, light is divergent. To be specific, two light adjacent to each other at the beginning are farther away from each other in a propagation process. Collimation is to keep light in a light beam parallel.

Single-photon detector (single-photon avalanche diode, SPAD): Once a photon is propagated to a surface of the SPAD, the single-photon detector is triggered to detect an optical signal. After being triggered, the SPAD may restore to an initial state (namely, a state that is not triggered) after a specific time period. The SPAD can only detect whether there is a photon irradiated on the surface of the SPAD, but cannot detect a quantity of photons irradiated on the surface of the SPAD.

In a 3D camera, if a transmit end emits light in a spot scanning manner, a requirement on a rotation angle of a rotatable scanning mirror in the transmit end is high, a requirement on a modulation speed of a light source is extremely high, and the requirements are difficult to meet. In addition, the transmit end of the 3D camera may also emit light in a line scanning manner. The line scanning manner means that the transmit end may emit a plurality of light beams in one direction, and the rotatable scanning mirror of the transmit end rotates in one direction, so that a receive end can capture an image of a target object. For example, in the line scanning manner, the transmit end may transmit a plurality of light beams in a vertical direction, and the rotatable scanning mirror of the transmit end rotates in a horizontal direction, so that the receive end can capture the image of the target object. Therefore, if light is emitted in the line scanning manner, the requirement on the rotation angle of the rotatable scanning mirror can be reduced.

Figure 3:
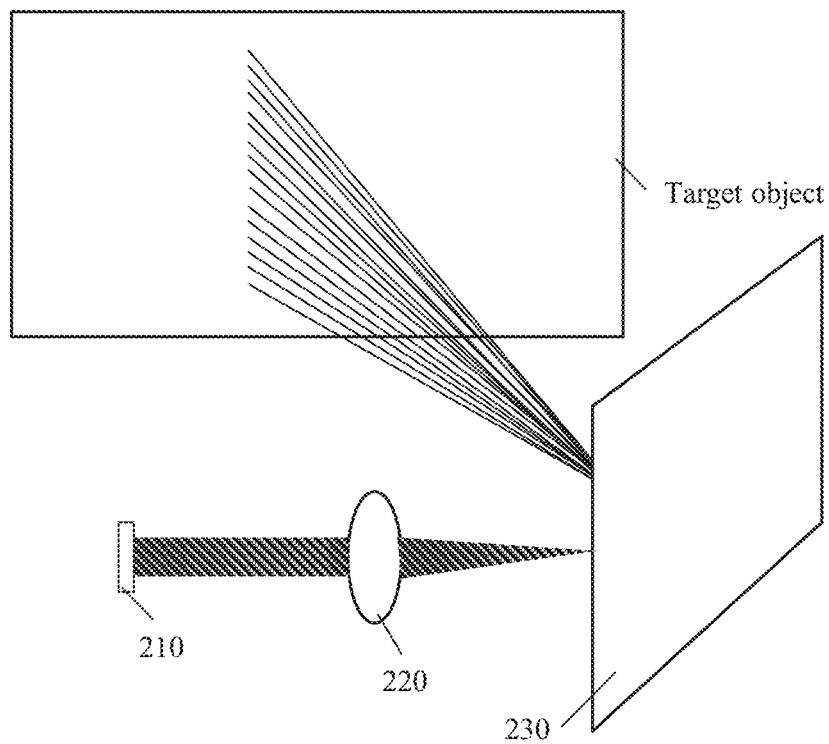
FIG. 3 is a schematic diagram of a structure of a transmit end in a line scanning manner according to an embodiment of this application.

For example, FIG. 3 is a schematic diagram of a structure of a transmit end in a line scanning technology. As shown in FIG. 3, the transmit end includes a linear light source 210, a lens 220, and a rotatable scanning mirror 230. The linear light source 210 is formed by a plurality of light sources arranged in one direction. In a line scanning manner shown in FIG. 3, the linear light source 210 emits a light beam, and the light beam is projected outwards by using the lens 220 and the rotatable scanning mirror 230. For example, a VGA image is scanned by using the line scanning technology. The linear light source 210 emits 480 light beams in a vertical direction, the rotatable scanning mirror rotates in a horizontal direction, and an angle of the rotatable scanning mirror is adjusted for 640 times, so that a receive end can capture a complete VGA image.

It may be understood that when the line scanning manner is used, a requirement on a rotation angle of the rotatable scanning mirror at the transmit end is reduced, and implementation difficulty of the transmit end is reduced. In the line scanning manner, one light beam emitted by the linear light source enables a receive end to collect one point of a target object, and one point on the target object corresponds to one pixel on the image. To meet a requirement of scanning precision, adjacent light sources in the linear light source are closely arranged. This arrangement manner of the light sources increases processing difficulty and installation difficulty of the linear light source, and is difficult to implement.

In the line scanning manner, one light beam emitted by a light source is projected onto one point of the target object; and the receive end collects a light beam reflected by the point of the target object, and forms a pixel on the image of the target object. In other words, one light beam emitted by the light source finally corresponds to one pixel on the image. In the line scanning manner, a problem of low utilization of the light source is not resolved.

An embodiment of this application provides an optical transmitting apparatus. An array light source is used. In other words, light sources are arranged in a plurality of rows and columns. Adjacent light sources do not need to be closely arranged in the array light source, which reduces processing difficulty and installation difficulty of the light sources. In addition, the optical transmitting apparatus includes an optical beam splitter, and the optical beam splitter may split one light beam into i light beams, where i is a positive integer, and i≥2. In this way, one light beam emitted by a light source can be projected onto i points of the target object, and utilization of the light source is improved.

The optical transmitting apparatus provided in this embodiment of this application may be used in the 3D camera, or may be used in an apparatus that uses a 3D sensing technology, such as a 3D scanner.

If the optical transmitting apparatus in this embodiment of this application is used as the transmit end of the 3D camera, the 3D camera may be disposed on an electronic device. The electronic device in this embodiment of this application may be a device, for example, a mobile phone, a tablet computer, a desktop device, a laptop device, a handheld computer, a notebook computer, an ultra-mobile personal computer (ultra-mobile personal computer, UmPC), a netbook, a cellular phone, a personal digital assistant (personal digital assistant, PDA), or an augmented reality (augmented reality, AR) device/a virtual reality (virtual reality, VR) device. A specific form of the electronic device is not specially limited in this embodiment of this application.

Figure 4:
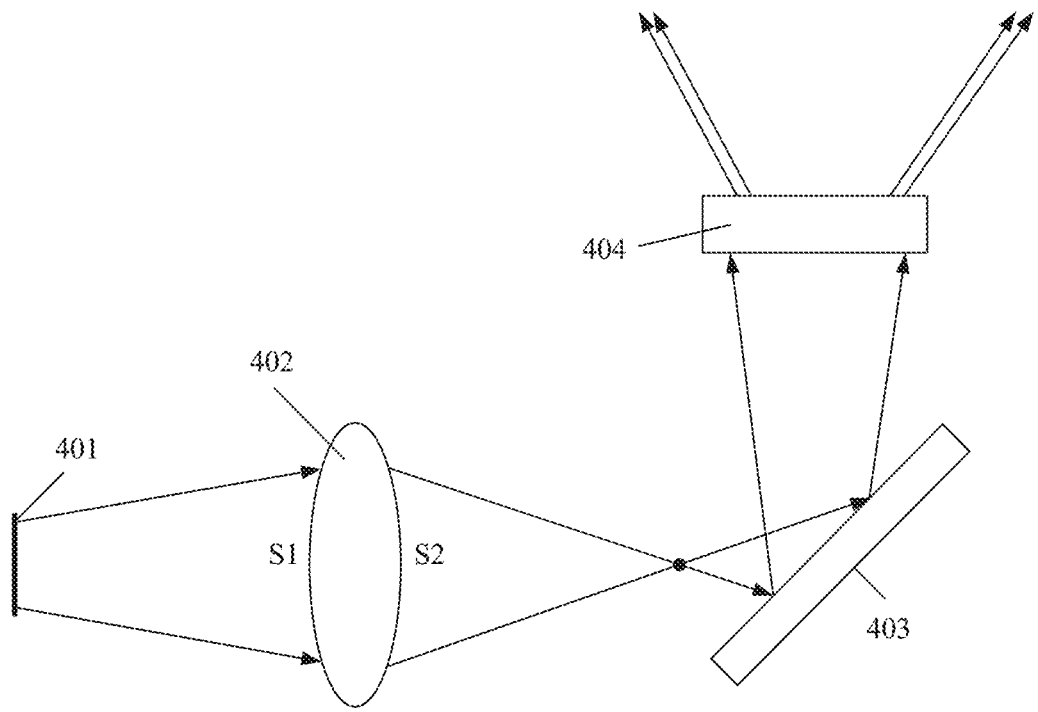
FIG. 4 is a schematic diagram of a structure of an optical transmitting apparatus according to an embodiment of this application.

FIG. 4 is a schematic diagram of a structure of an optical transmitting apparatus according to an embodiment of this application. The optical transmitting apparatus includes: an array light source 401, a collimating lens 402, a rotatable scanning mirror 403, and an optical beam splitter 404.

As shown in FIG. 4, the array light source 401 is located on a first side S1 of the collimating lens 402, a plane on which the array light source 401 is located is perpendicular to an optical axis of the collimating lens 402, and a distance between the plane on which the array light source 401 is located and a center point of the collimating lens 402 is a focal length of the collimating lens 402. The rotatable scanning mirror 403 is located on a second side S2 of the collimating lens 402, and a center point of a reflective surface of the rotatable scanning mirror 403 is on the optical axis of the collimating lens 402.

The array light source 401 includes M×N light sources. When K light sources in the array light source 401 are working, the array light source 401 may emit K light beams, where K≥1, and K is a positive integer. In other words, the array light source 401 may emit a plurality of light beams. The K light beams may be emitted by the K light sources in the M×N light sources. The plane on which the array light source 401 is located is perpendicular to the optical axis of the collimating lens 402. In other words, the array light source 401 faces the collimating lens 402. In this case, the K light beams emitted by the array light source 401 are propagated to the collimating lens 402 along the optical axis. The collimating lens 402 has a function of collimating light beams. Therefore, the collimating lens 402 may convert the K light beams into K collimated light beams (namely, first collimated light beams). The center point of the reflective surface of the rotatable scanning mirror 403 is on the optical axis of the collimating lens 402, so that the K first collimated light beams can be propagated to the rotatable scanning mirror 403. The reflective surface of the rotatable scanning mirror 403 is configured to reflect the K first collimated light beams into K second collimated light beams.

For example, the M×N light sources may be arranged in M rows of light sources and N columns of light sources, or may be arranged in N rows of light sources and M columns of light sources. That the array light source 401 includes M rows and N columns of light sources is used as an example. A spacing between two adjacent columns of light sources in the N columns of light sources is a first preset distance, a spacing between two adjacent rows of light sources in the M rows of light sources is a second preset distance, and an included angle between any column of light sources in the N columns of light sources and any row of light sources in the M rows of light sources is a preset angle.

Figure 5A:
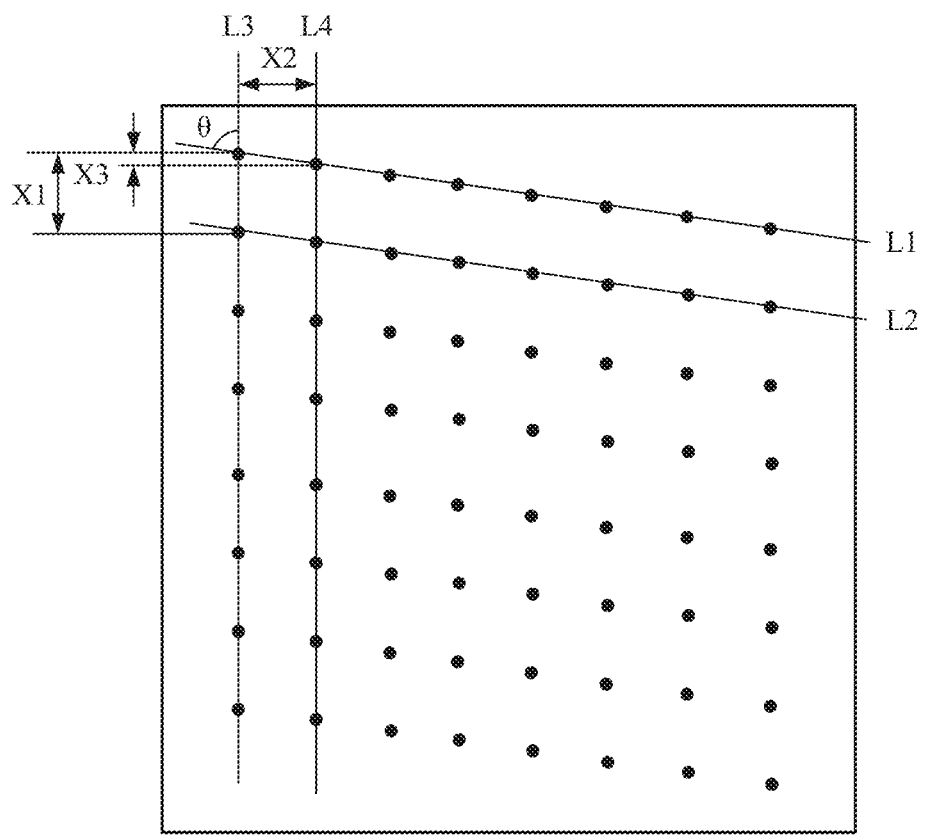
FIG. 5A is a schematic diagram of a structure of an array light source according to an embodiment of this application.

For example, it is assumed that both M and N are 8. FIG. 5A is a schematic diagram of a structure of the array light source 401. As shown in FIG. 5A, light sources on a straight line L1 are light sources in a first row, light sources on a straight line L2 are light sources in a second row, light sources on a straight line L3 are light sources in a first column, and light sources on a straight line L4 are light sources in a second column. A spacing between two adjacent columns is a spacing between adjacent light sources in a same row, and a spacing between two adjacent rows is a spacing between adjacent light sources in a same column. As shown in FIG. 5A, a spacing between L1 and L2 is a distance X1 between adjacent light sources on L3, and a spacing between L3 and L4 is a distance X2 between adjacent light sources on L1. An included angle between the light sources on L1 in the first row and the light sources on L3 in the first column is θ. If a difference between two adjacent light sources, in a horizontal direction, in the light sources on L1 in the first row is X3, X3 may also be understood as a distance by which the light sources in the second column are moved downwards by X3 relative to the light sources in the first column. In this case, θ may be represented as arctan $$\frac{X2}{X3}.$$

In this embodiment of this application, the included angle between any column of light sources and any row of light sources in the array light source 401 is the preset angle, and the preset angle may be an acute angle, in other words, less than 90°. If the light sources in each column are sequentially arranged in a vertical direction, the light sources in each row are not located on a same horizontal line. As shown in FIG. 5A, the light sources in each row are not disposed on a same horizontal line.

In some implementations, the array light source 401 includes 8*8 light sources, X1 is 40 μm (micrometer), X2 is 40 μm (micrometer), and X3 is 5 μm (micrometer). As shown in FIG. 5A, a position of each column of light sources is moved downwards by 5 μm compared with a position of a previous column of light sources. Specifically, the light source in the array light source 401 may be a laser.

Figure 5B:
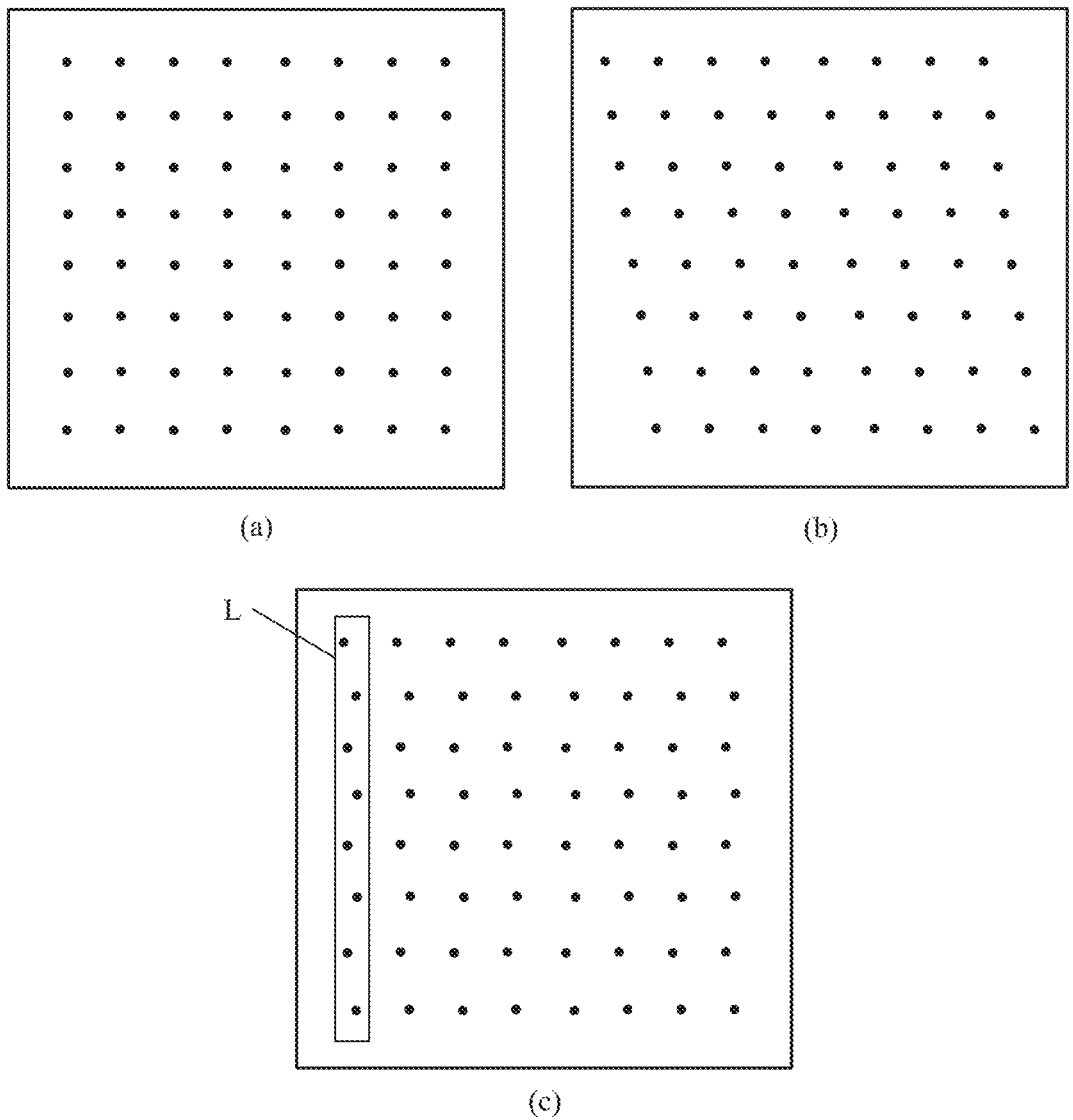
FIG. 5B is a schematic diagram of a structure of another array light source according to an embodiment of this application.

For another example, an arrangement manner of the light sources in the array light source 401 may alternatively be shown in FIG. 5B. That the array light source 401 includes the 8*8 light sources is used as an example. Specifically, in (a) in FIG. 5B, the included angle between any column of light sources in the N columns of light sources and any row of light sources in the M rows of light sources is a preset angle 90°. As shown in (b) FIG. 5B, a position of a next row of light sources in the array light source 401 moves rightwards by a preset distance compared with a position of a previous row of light sources. In this case, the included angle between any column of light sources in the N columns of light sources and any row of light sources in the M rows of light sources is a preset angle from 0° to 90°. As shown (c) in FIG. 5B, in the first column of light sources represented by L in the array light source 401, light sources in the column of light sources may not be in a same vertical direction.

It may be understood that, any light source in the array light source may emit a light beam, or any row or any column of light sources in the array light source may emit light beams. Alternatively, some light sources in the array light source emit light beams. For example, the array light source includes the 8*8 light sources, and 4*4 light sources in the array light source may be controlled to emit light beams.

The light sources in the array light source may include at least one of an edge light emitting semiconductor laser, a vertical-cavity surface-emitting laser (Vertical-Cavity Surface-Emitting Laser, VCSEL), a fiber laser, or a solid state laser. In addition, a light beam emitted by a light source in the array light source may be of any wavelength. If the optical transmitting apparatus is used as the transmit end of the 3D camera, the wavelength of the light beam emitted by the array light source needs to be determined, so that the receive end of the 3D camera can determine that a received light beam is a light beam emitted by the transmit end.

In this embodiment of this application, a function of the collimating lens 402 is to convert the light beams emitted by the light source into the first collimated light beams.

In some implementations, the collimating lens 402 in this embodiment of this application may be a single lens, and the single lens is a lens formed by one piece of optical glass. In other words, the collimating lens 402 may be a convex lens. In some other implementations, the collimating lens 402 may alternatively be formed by a plurality of optical elements. For example, the collimating lens is formed by a plurality of lenses. The collimating lens 402 may convert a light beam emitted by a light source into a collimated light beam.

The distance between the plane on which the array light source 401 is located and the center point of the collimating lens 402 is the focal length of the collimating lens 402. In other words, the plane on which the array light source 401 is located includes a focal point of the collimating lens 402. Therefore, the light beams emitted by the array light source 401 changes to the collimated light beams after passing through the collimating lens 402. However, because locations of the light sources in the array light source 401 are different, locations at which the light beams emitted by the light sources are incident to the collimating lens 402 are also different. After the collimating lens 402 converts the light beams emitted by the light sources into the first collimated light beams, exit angles of the first collimated light beams are also different.

For example, it is assumed that the collimating lens 402 is a single lens, in other words, the collimating lens 402 is a convex lens. The focal length of the convex lens may be 3.4 mm (millimeter).

Figure 6:
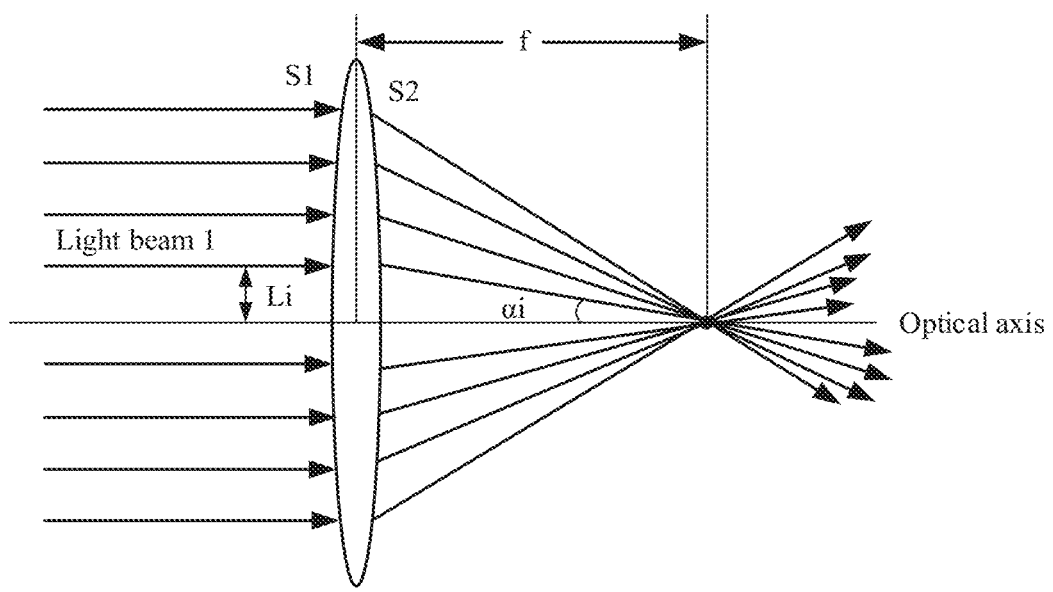
FIG. 6 is a schematic diagram of a structure of a collimating lens according to an embodiment of this application.

FIG. 6 is a schematic diagram of a structure of the collimating lens 402. A plurality of light beams represent light beams emitted by light sources at different positions in the array light source 401, the light beams emitted by the light sources become the first collimated light beams after passing through the collimating lens 402, and the first collimated light beams pass through a focus of the collimating lens 402 on the second side. As shown in FIG. 6, the light beam 1 is converted by the collimating lens 402 and is propagated along an exit direction of the collimating lens 402. An exit angle of the light beam emitted by the light source after passing through the collimating lens 402 is represented as $$\alpha i = \arctan\frac{Li}{f}.$$

αi represents the exit angle of the light beam emitted by the light source, Li represents the distance between the light beam and the optical axis of the collimating lens 402, and f represents the focal length of the collimating lens 402.

The collimating lens 402 converts the light beams emitted by the array light source 401 into the first collimated light beams, where the first collimated light beams are propagated along exit directions. The array light source 401 is located on the first side of the collimating lens 402. The light beams emitted by the array light source 401 are incident from the first side to the collimating lens 402. After the collimating lens 402 converts the light beams into the first collimated light beams, the first collimated light beams are propagated on the second side of the collimating lens 402 along the exit directions. The rotatable scanning mirror 403 is located on the second side of the collimating lens 402, and the center point of the reflective surface of the rotatable scanning mirror 403 is on the optical axis of the collimating lens 402.

After the first collimated light beams are propagated to the rotatable scanning mirror 403, the first collimated light beams are reflected by the reflective surface of the rotatable scanning mirror 403 into second collimated light beams. In other words, the rotatable scanning mirror 403 is configured to change propagation directions of the first collimated light beams.

In some implementations, a controller is disposed on the rotatable scanning mirror 403. The controller is configured to receive a control signal, and transmit the control signal to the rotatable scanning mirror 403. The control signal indicates the rotatable scanning mirror 403 to adjust an angle of the reflective surface on the rotatable scanning mirror 403. The rotatable scanning mirror 403 is configured to receive the control signal, and adjust the angle of the reflective surface based on the control signal, to adjust propagation directions of the second collimated light beams.

For example, the rotatable scanning mirror 403 may be a micro-electro-mechanical systems (micro-electro-mechanical systems, MEMS) reflector, or a digital micromirror device (digital micromirror device, DMD).

For example, the MEMS reflector is driven through electrostatic or electromagnetic. Specifically, the control signal may be an electrostatic signal, and electrostatic driving is generated based on the electrostatic signal to control an angle of the MEMS reflector. Alternatively, the control signal is a current signal, and electromagnetic driving is generated through a change of the current, to control the angle of the MEMS reflector. Because the MEMS reflector is small, light, and has a short response time period, light emission efficiency of the optical transmitting apparatus can be improved.

For another example, the DMD includes a plurality of micromirror devices. In other words, each DMD includes the plurality of micromirror devices. The DMD is driven by a digital signal. Specifically, the control signal may be a digital signal, and the angle of the DMD is controlled based on the digital signal, to adjust the propagation directions of the second collimated light beams.

Alternatively, the rotatable scanning mirror may be a lens driven by a motor. In addition, the rotatable scanning mirror may implement one-dimensional rotation (namely, rotation in one direction), or may implement two-dimensional rotation (namely, rotation in two directions). When the rotatable scanning mirror implements one-dimensional rotation, one array may be projected each time. Scanning can be completed through projection for a plurality of times, and a predetermined resolution is implemented. In addition, a shape of the rotatable scanning mirror may be a circle, a rectangle, a polygon, or the like.

In the optical transmitting apparatus, the optical beam splitter 404 is configured to split one light beam into i light beams, where and i≥2, and i is a positive integer. The optical beam splitter 404 includes an incident surface and an exit surface. One light beam enters the optical beam splitter 404 from the incident surface, and the i light beams are emitted from the exit surface.

The optical beam splitter may be a one-dimensional grating, a two-dimensional diffractive optical element, or a prism film. The one-dimensional grating may split one light beam into i light beams, and a specific quantity of light beams obtained through splitting is related to a quantity of gratings of the one-dimensional grating. For light beam splitting effect of the one-dimensional grating, refer to the schematic diagram of light beam splitting of the diffractive optical element shown in (a) in FIG. 2. The two-dimensional diffractive optical element may split one light beam into a light beam matrix including i light beams. For light beam splitting effect of the two-dimensional diffractive optical element, refer to the schematic diagram of light beam splitting of the diffractive optical element shown in (b) in FIG. 2.

In some implementations, when the optical beam splitter is the prism film, the exit surface of the optical beam splitter 404 is of a prism film structure. The prism film structure is a film whose surface is of a prism shape. That the prism is of a triangular prism structure is used as an example. As shown in (a) in FIG. 7, an incident surface 70 is a plane, an exit surface 71 includes eight prisms, and angles between the prisms and a horizontal plane are different. In this case, propagation directions of light beams emitted from the prisms are also different. As shown in (a) in FIG. 7, an included angle between a prism 1 and the horizontal plane is β1, an included angle between a prism 2 and the horizontal plane is −β1, an included angle between a prism 3 and the horizontal plane is β2, an included angle between a prism 4 and the horizontal plane is −β2, an included angle between a prism 5 and the horizontal plane is β3, an included angle between a prism 6 and the horizontal plane is −β3, an included angle between a prism 7 and the horizontal plane is β4, and an included angle between a prism 8 and the horizontal plane is −4. As shown in (b) in FIG. 7, when one light beam is propagated to the optical beam splitter 404, the optical beam splitter 404 may split the one incident light beam into eight exit light beams. As shown in (b) in FIG. 7, I1 represents one incident light beam, O1 represents an exit light beam 1, O2 represents an exit light beam 2, O3 represents an exit light beam 3, . . . , and O8 represents an exit light beam 8. Arrows in the figure represent propagation directions of light, and the exit light beams have different propagation directions.

Figure 7:
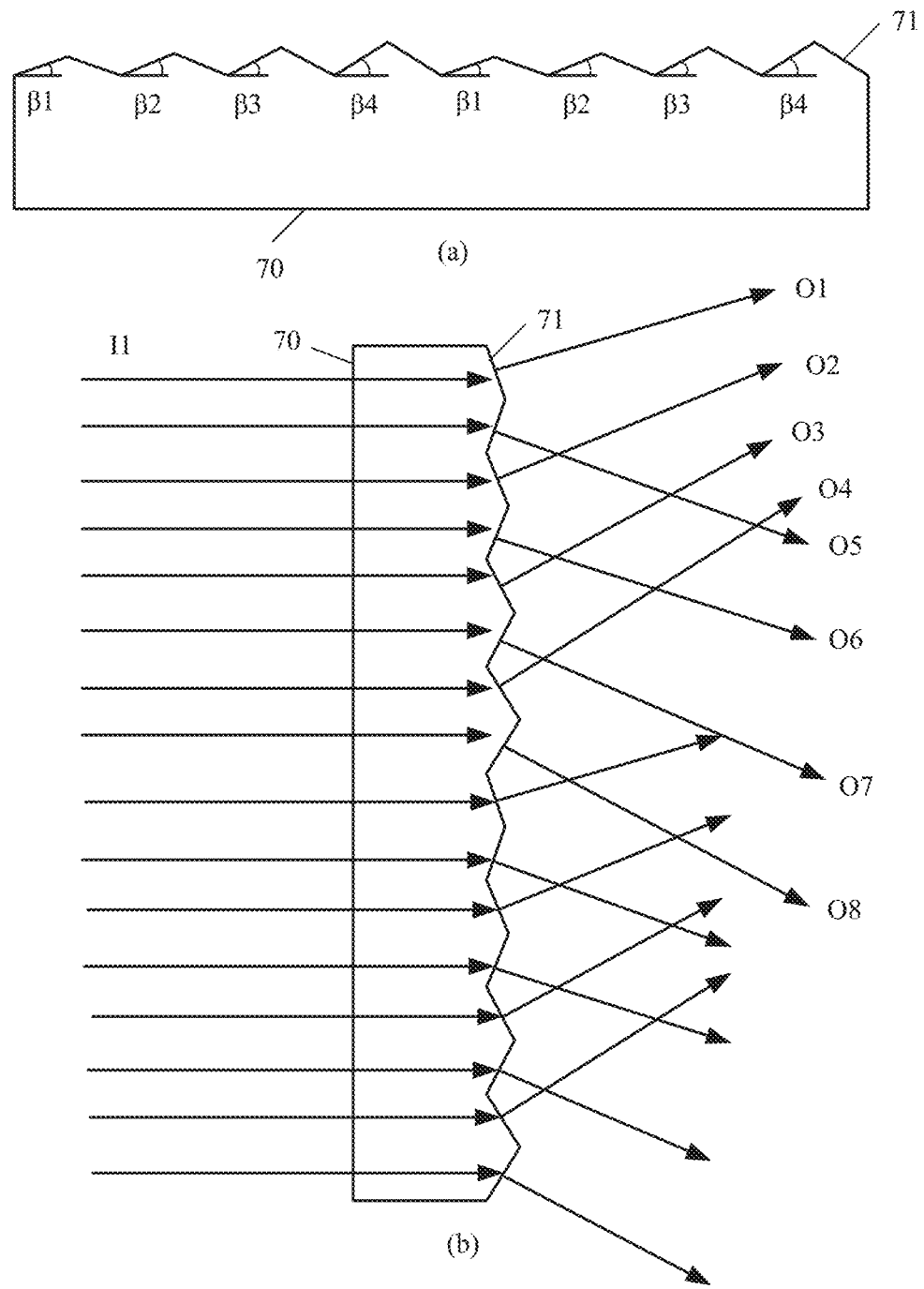
FIG. 7 is a schematic diagram of a structure of an optical beam splitter according to an embodiment of this application.
Figure 8:
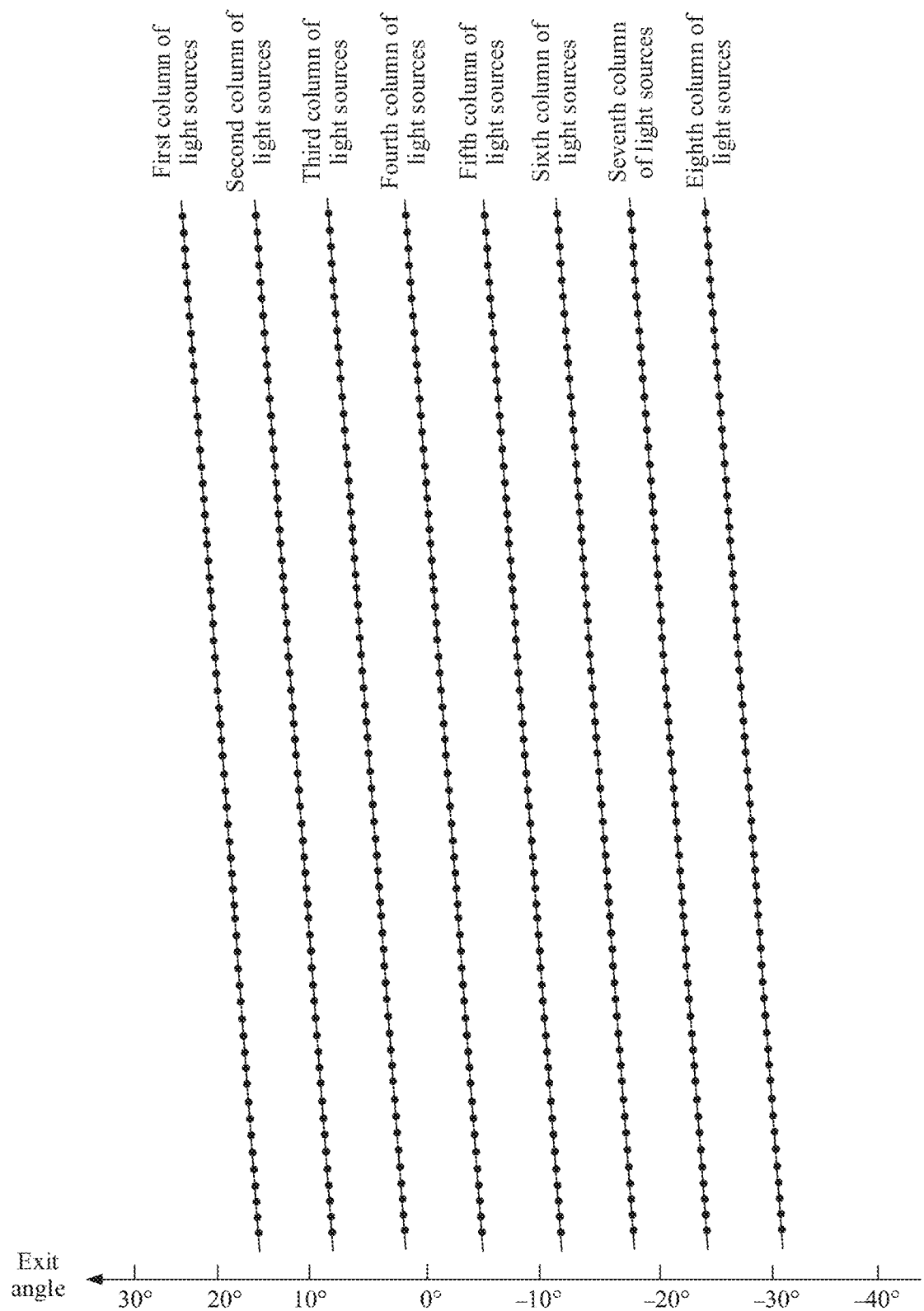
FIG. 8 is a schematic diagram of a light exit angle of an optical transmitting apparatus according to an embodiment of this application.

For example, in the eight prisms on the exit surface 71 shown in (a) in FIG. 7, it is assumed that β1 is 5.4°, β2 is 15.5°, β3 is 24.2°, and β4 is 31.5°. It may be understood that, if the array light source 401 has 8*8 light sources, it is assumed that each light source emits a light beam. The light beams emitted by the array light source 401 are propagated to the collimating lens 402, and the collimating lens 402 converts 8*8 light beams into 8*8 first collimated light beams. The 8*8 first collimated light beams are propagated to the reflective surface of the rotatable scanning mirror 403, and the reflective surface of the rotatable scanning mirror 403 reflects the 8*8 first collimated light beams into 8*8 second collimated light beams. The 8*8 second collimated light beams are propagated to the optical beam splitter 404 along a reflection direction, and the optical beam splitter 404 may split the 8*8 second collimated light beams into 8*8*8 (512) light beams. Exit angles of the 512 light beams are shown in FIG. 8. A light beam emitted by one light source in each column is split into eight light beams. For example, 64*8 light beams are shown in the figure. An angle corresponding to each point in a vertical direction represents an exit angle of one light beam in a longitudinal direction.

When the optical beam splitter is the prism film, the optical beam splitter may be made of optical plastics such as glass, polymethyl methacrylate (polymethyl methacrylate, PMMA for short), polycarbonate (Polycarbonate, PC), and a polyimide film (Polyimide Film, PI). Specifically, the prism film may be processed by using technologies such as etching, imprinting, and micro-replication.

In some other implementations, the optical beam splitter 404 may be an optical beam splitter 404 having a one-dimensional spot array light beam splitting function, or may be an optical beam splitter 404 having a two-dimensional spot array light beam splitting function.

It should be noted that the array light source 401 includes the M×N light sources. When the array light source 401 is working, all the M×N light sources may be controlled to emit light, or some of the M×N light sources may be controlled to emit light. For example, light sources in the first column of the array light source 401 are controlled to emit light, light sources in the first row of the array light source 401 are controlled to emit light, or a light source in the array light source 401 is controlled to emit light.

In this embodiment of this application, the array light source 401 in the optical transmitting apparatus may emit the K light beams, where 2≤K≤M×N, and K is a positive integer. The K light beams are propagated to the collimating lens 402, the collimating lens 402 converts the K light beams into the K first collimated light beams, the K first collimated light beams are propagated to the reflective surface of the scanning rotating lens, the scanning rotating lens reflects the K first collimated light beams into the K second collimated light beams, the K second collimated light beams are propagated to the optical beam splitter 404, and the optical beam splitter 404 splits the K second collimated light beams into i×K third collimated light beams. The i×K third collimated light beams are propagated to the target object along the propagation direction, and are emitted or refracted by the target object.

Generally, when the target object is photographed by using the 3D camera, the transmit end projects the emitted light beam onto the target object, and the light beam projected onto the target object is reflected by the target object. The receiving apparatus is configured to receive the light beam emitted by the target object, and generate an image of the target object based on the received light beam. The light beam is projected onto one point of the target object. The receiving apparatus receives the light beam reflected by the target object, and one light beam corresponds to one pixel on the generated image of the target object.

Figure 9:
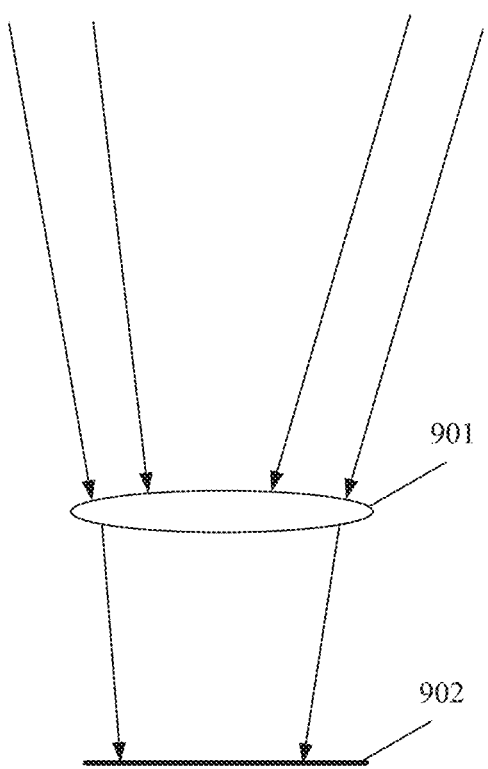
FIG. 9 is a schematic diagram of a structure of a receiving apparatus according to an embodiment of this application.

Refer to FIG. 9. An embodiment of this application further provides a receiving apparatus. As shown in FIG. 9, the receiving apparatus includes a receiving lens 901 and an image sensor 902. An optical axis of the receiving lens 901 is perpendicular to a plane on which the image sensor 902 is located. The receiving lens 901 is configured to receive the light beam reflected by the target object, and refract the light beam reflected by the target object into a refracted light beam. The refracted light beam is irradiated on the image sensor 902, so that the target object is imaged on the image sensor 902.

The receiving apparatus is configured to receive the light reflected by the target object. If ambient light is irradiated on the target object and is reflected by the target object, the light may also enter the receiving apparatus, so that the target object is imaged on the image sensor 902. The ambient light may affect an image that is of the target object and that is obtained by the receiving apparatus.

In some implementations, the receiving apparatus may further include an optical filter. The optical filter is disposed between the receiving lens 901 and the image sensor 902, and the optical filter is parallel to the plane on which the image sensor 902 is located. The optical filter is configured to filter out the ambient light in the refracted light beam.

Specifically, the optical transmitting apparatus is configured to project the light beam to the target object, and the receiving apparatus provided in this embodiment of this application is configured to receive the light beam reflected by the target object. If the optical transmitting apparatus and the receiving apparatus can cooperate with each other, the image of the target object is photographed.

The image sensor 902 on the receiving apparatus includes a detector, and the detector is configured to collect a photon reflected to the detector. The image sensor 902 determines a pixel at a location based on the photon reflected to the detector, and each pixel on the image sensor 902 corresponds to one detector. It should be noted that the detector herein is a detector in a functional sense, in other words, the detector is configured to identify whether the pixel has a photon. The detector may include one SPAD, or may include a plurality of SPADs. If the detector includes one SPAD, the detector identifies only a photon on the pixel. If the detector includes the plurality of SPADs, each of the SPADs correspondingly detects a photon on one pixel. In addition, the detector may further include a silicon-avalanche photodiode (Si-Avalanche PhotonDiode, SiAPD) or an avalanche photodiode (Avalanche PhotonDiode, APD).

In a first implementation, one detector includes one SPAD. Because one detector includes one SPAD, a quantity of detectors in the image sensor 902 in the receiving apparatus corresponds to pixels of the generated image. For example, if the quantity of detectors in the receiving apparatus is 640*480, a resolution of the image generated by the receiving apparatus is also 640*480.

Figure 10:
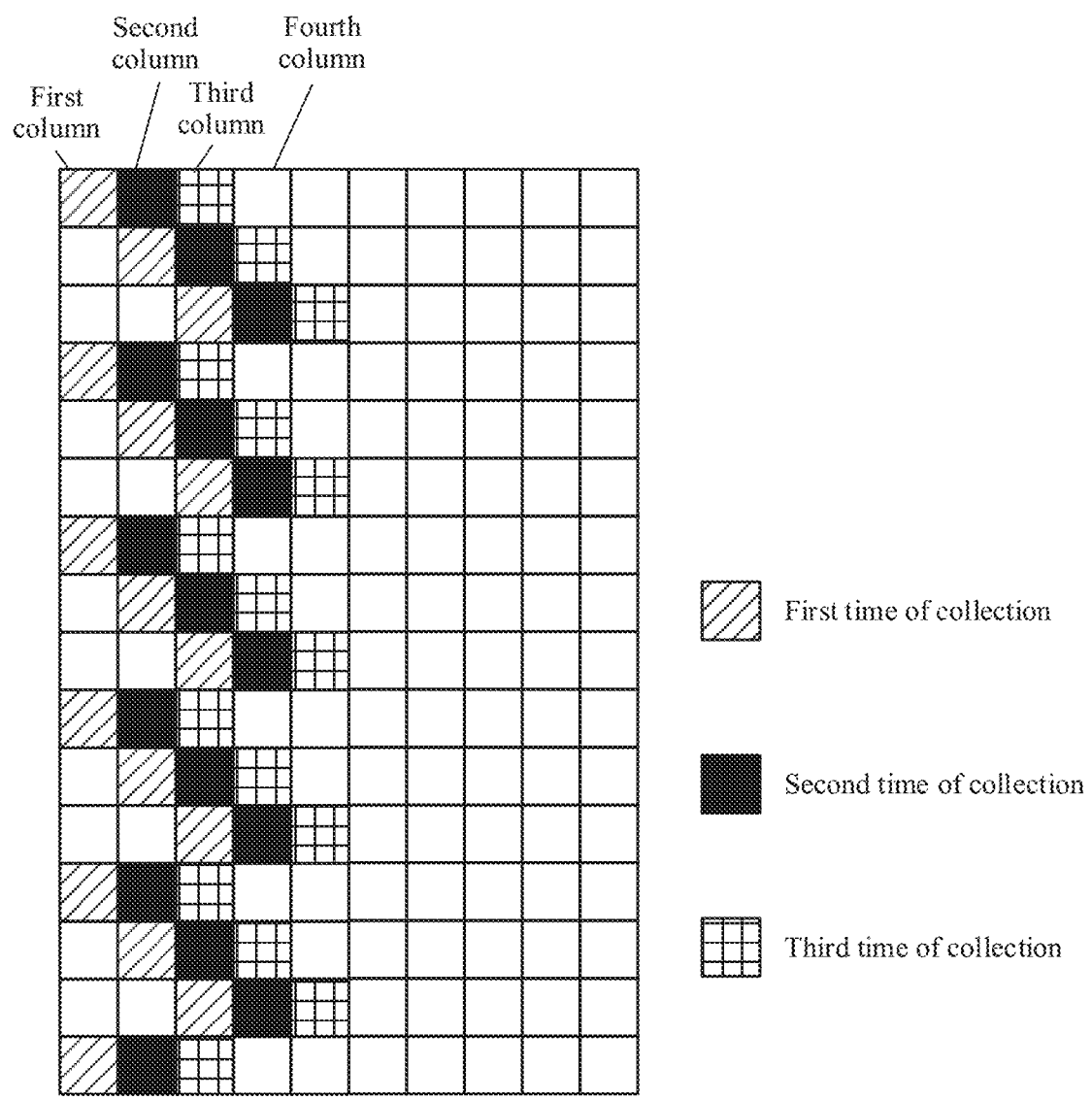
FIG. 10 is a schematic diagram of collecting and scanning by a receiving apparatus according to an embodiment of this application.

For example, it is assumed that the array light source 401 in the optical transmitting apparatus is a 3×8 array light source 401, and the optical beam splitter 404 may split one light beam into two light beams. Therefore, the optical transmitting apparatus can emit 3×16 light beams. Specifically, one detector includes one SPAD, and the photon collected by the detector correspond to one pixel on the generated image. FIG. 10 is a schematic diagram after the detector performs collection for three times. Each square in FIG. 10 (only some detectors are shown) is equivalent to one pixel on the image. When the rotatable scanning mirror 403 is at a first angle and a time point is T0, photons that are reflected by the target object and that are collected by the detector for the first time correspond to locations of pixels on the image (for example, pixels collected for the first time are in the first column, the second column, and the third column in FIG. 10). After the rotatable scanning mirror 403 is rotated by a preset angle and the time point is T1, photons that are reflected by the target object and that are collected by the detector for the second time correspond to locations of pixels on the image (for example, pixels collected for the second time are in the second column, the third column, and the fourth column in FIG. 10). After the rotatable scanning mirror 403 is rotated by the preset angle again and the time point is T2, photons that are reflected by the target object and that are collected by the detector for the third time correspond to locations of pixels on the image (for example, pixels collected for the third time are in the third column, the fourth column, and the fifth column in FIG. 10).

In a second implementation, one detector includes the plurality of SPADs. For example, a pixel of the image sensor 902 is E×F, and both E and F are positive integers. The image sensor 902 includes j detectors, where j is greater than or equal to 2, j is less than E×F, and j is a positive integer.

Figure 11:
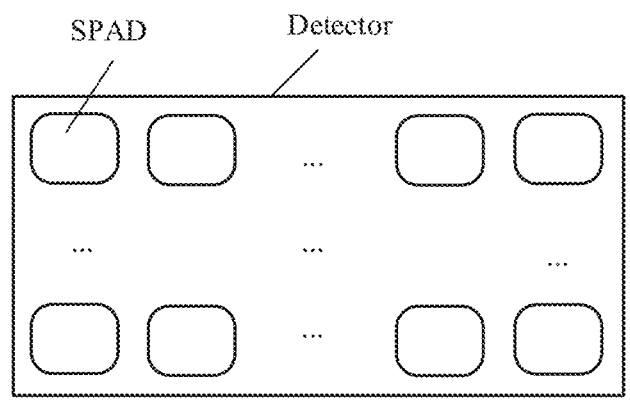
FIG. 11 is a schematic diagram of a structure of a detector according to an embodiment of this application.

FIG. 11 is a schematic diagram of a structure of a detector according to an embodiment of this application. As shown in FIG. 11, one detector includes 8*8 SPADs, and the SPADs are not completely shown in the figure.

It should be noted that the SPAD can identify only photons, but cannot identify a quantity of photons. The SPAD is triggered when the photon is identified, and can be restored to an initial state only after a preset time period. When one detector includes the plurality of SPADs, if one SPAD is triggered, the detector is in a triggered state. Therefore, in this embodiment of this application, a status of the detector may be controlled in a time-sharing working manner.

Figure 12:
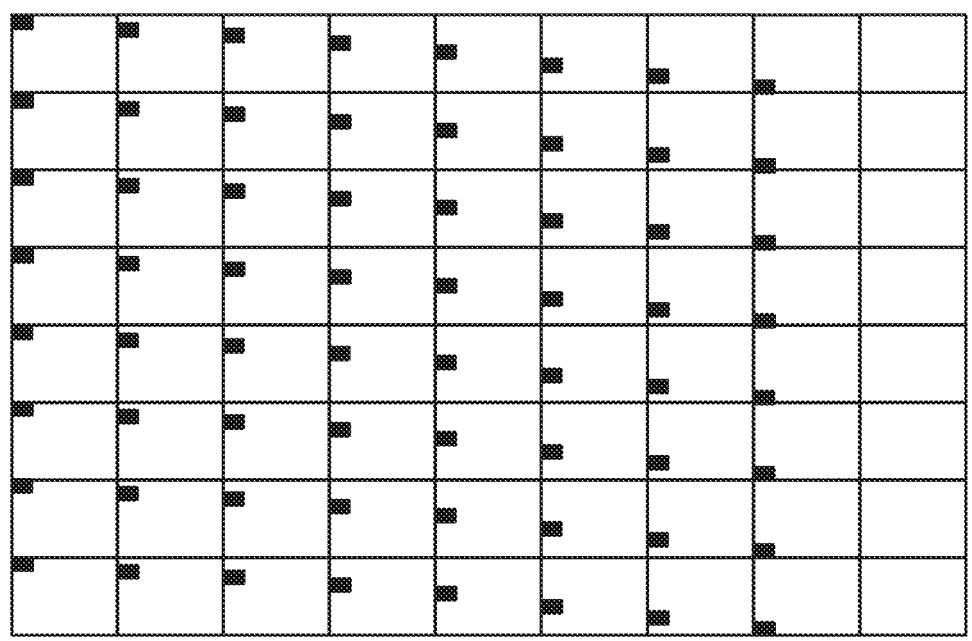
FIG. 12 is a schematic diagram of a result of collecting and scanning by a detector according to an embodiment of this application.

Example 1: An example in which the array light source 401 in the optical transmitting apparatus is an 8*8 array light source 401 is used. The optical beam splitter 404 splits one light beam into eight light beams, and an example in which one detector in the receiving apparatus shown in FIG. 11 includes the 8*8 SPADs is used. Specifically, the array light source 401 emits 8*8 light beams, and each light source is split into eight light beams. For example, one light beam is split into eight light beams in a horizontal direction. Because each detector includes the 8*8 SPADs, if a VGA image needs to be obtained, the image sensor 902 may include 60*80 detectors. FIG. 12 is a schematic diagram of imaging on the detector of the receiving apparatus. Small black squares represent collected pixels (not all pixels are shown in the figure).

Specifically, if the 8*8 light sources in the array light source 401 are working at the same time, the detector may collect 512 pixels at the same time. Because each column of light beams is distributed in different detectors, when the angle of the rotatable scanning mirror 403 in the optical transmitting apparatus changes, locations of the small black squares in FIG. 12 change accordingly. In this case, each detector may collect 8*8 pixels, and one detector does not collect two pixels at the same time. If the receiving apparatus of this structure is used to obtain the VGA image, the image sensor 902 may include 60*80 detectors.

Figure 13:
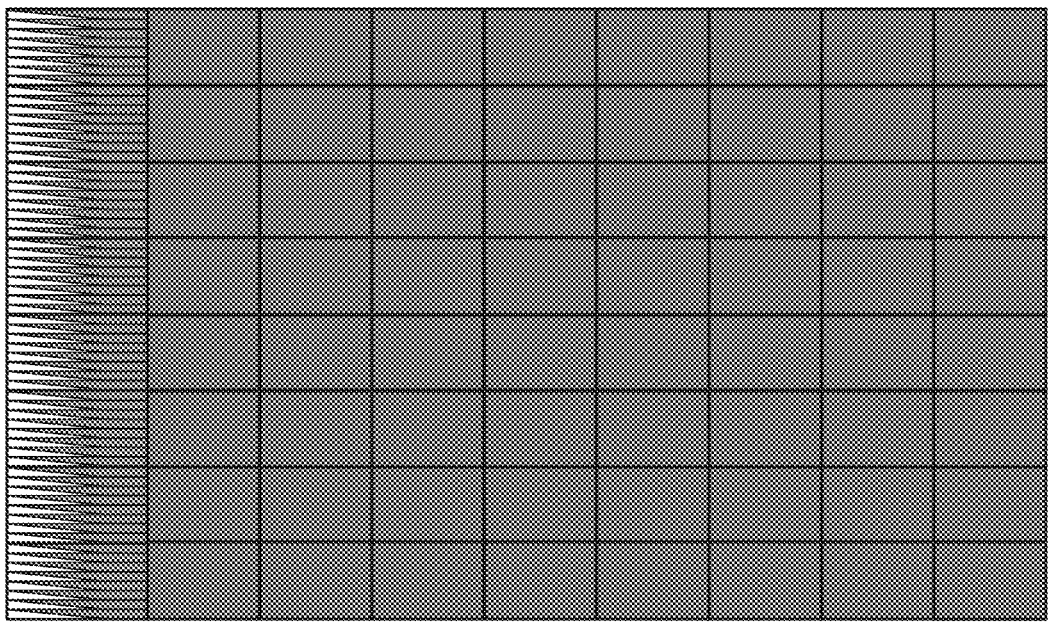
FIG. 13 is another schematic diagram of a result of collecting and scanning by a detector according to an embodiment of this application.

For example, because images captured by detectors in the first seven columns are incomplete, in an actual operation, the optical transmitting apparatus needs to scan 696 columns (56 incomplete columns+640 complete columns). FIG. 13 is a schematic diagram of the VGA image formed by the receiving apparatus, including 640 columns of pixels in a longitudinal direction and 480 rows of pixels in a transverse direction. Because the images in pixels in the first seven columns are not completely and discarded, in actual use, the pixels formed in the first seven columns (detectors in the first seven columns are not shown in the figure) may be ignored.

Example 2: An example in which the array light source 401 in the optical transmitting apparatus is an 8*8 array light source 401 is used. The optical beam splitter 404 may split one light beam into a 3*8 two-dimensional array light beam, and an example in which one detector in the receiving apparatus includes 8*8 SPADs is used.

Figure 14:
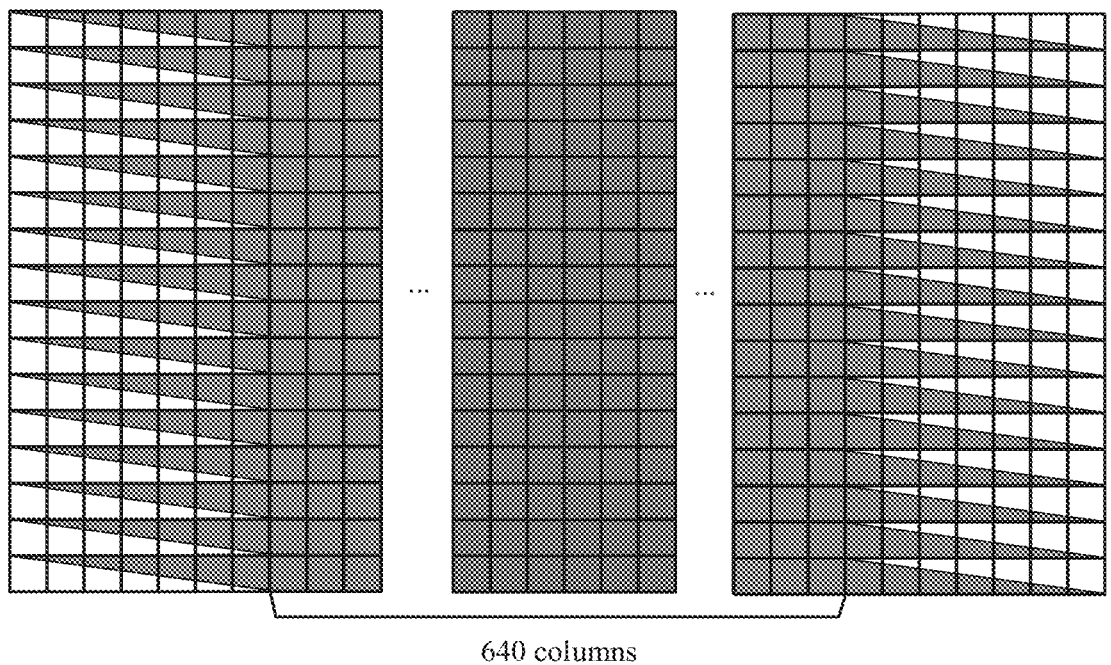
FIG. 14 is another schematic diagram of a result of collecting and scanning by a detector according to an embodiment of this application.

The array light source 401 may emit 64*8*3=512*3 spot array light beams at the same time. The array light source 401 may be divided into three parts, each part includes eight columns, and each column includes 64 spot array light beams. The three parts may be evenly distributed on the detectors of the receiving apparatus. Each part occupies ⅓ of the entire image pixels. As shown in FIG. 14 (only some detectors are shown), obtaining the VGA image is used as an example. The optical transmitting apparatus completes scanning of 696 columns. Because the detectors are divided into the three parts, each part of detectors completes scanning of 696/3=232 columns of detectors. In this way, the receiving apparatus can obtain the VGA image only if the rotatable scanning mirror 403 in the optical transmitting apparatus supports each spot array to scan 232 columns of detectors. In this way, the quantity of detectors can be greatly reduced.

The quantity of detectors in the image sensor 902 is less than the quantity of pixels, and an image of a corresponding resolution can be formed on the image sensor 902. In other words, the quantity of detectors in the image sensor 902 may be reduced, and costs are reduced.

In a possible implementation, because the array light source 401 includes the 8*8 light sources, if each light source is working, the optical transmitting apparatus may generate 512 light beams each time. For example, each light source in the array light source 401 is separately controlled. One light source may be split into eight light beams, each light source in the array light source 401 works independently, and the 8*8 light sources are sequentially turned on. That is, after each light source completes a scanning task, a next light source is turned on. In this way, a requirement for generating the VGA image can be met by disposing 8*10 detectors on the image detector.

It should be noted that in the foregoing implementation, the quantity of detectors is less than the quantity of pixels.

Figure 15A:
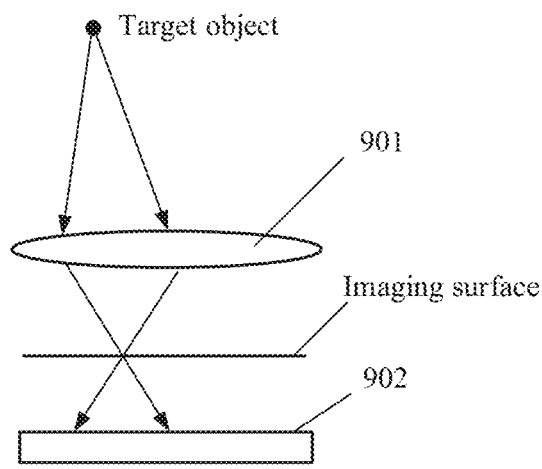
FIG. 15A is a schematic diagram of a structure of another receiving apparatus according to an embodiment of this application.
Figure 15B:
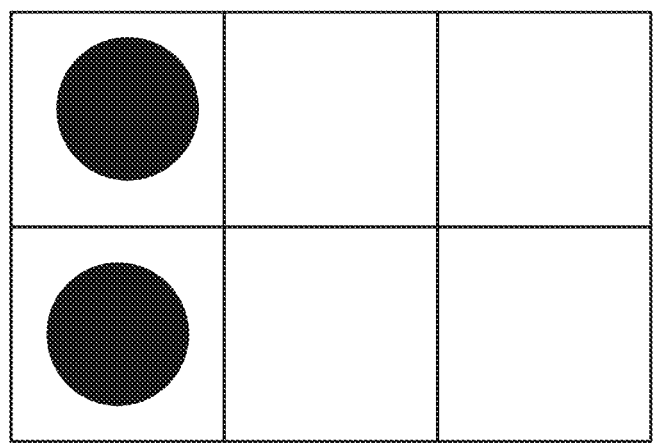
FIG. 15B is a schematic diagram of collecting a light beam on an image sensor according to an embodiment of this application.

A light spot formed on an imaging surface of the image sensor 902 by the light beam reflected by the target object becomes smaller. The distance between the image sensor 902 and the receiving lens 901 may be less than the focal length of the receiving lens 901, so that a large light spot can be obtained on the image sensor 902. Alternatively, the distance between the image sensor 902 and the receiving lens 901 is greater than the focal length of the receiving lens 901 and less than twice a focal length of the receiving lens 901. As shown in FIG. 15A, the distance between the image sensor 902 and the receiving lens 901 is greater than the focal length of the receiving lens 901, so that the light spot formed on the image sensor 902 becomes larger. FIG. 15B is a schematic diagram of a shape of the light spot on the image sensor 902. The shape of the light spot becomes larger, to form the image of the target object.

Figure 16:
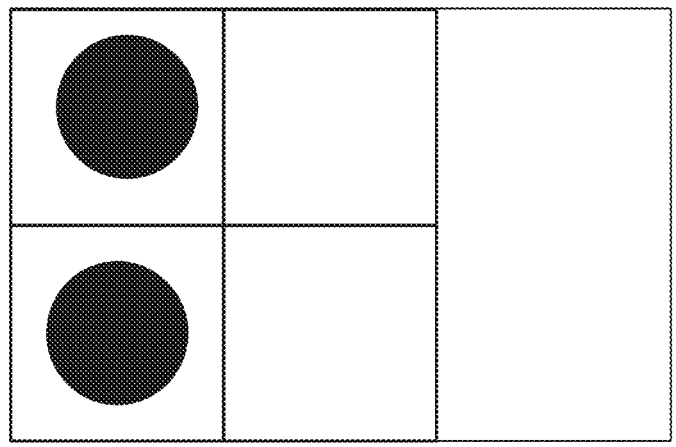
FIG. 16 is a schematic diagram of receiving a light spot by a detector in a receiving apparatus according to an embodiment of this application.
Figure 16:
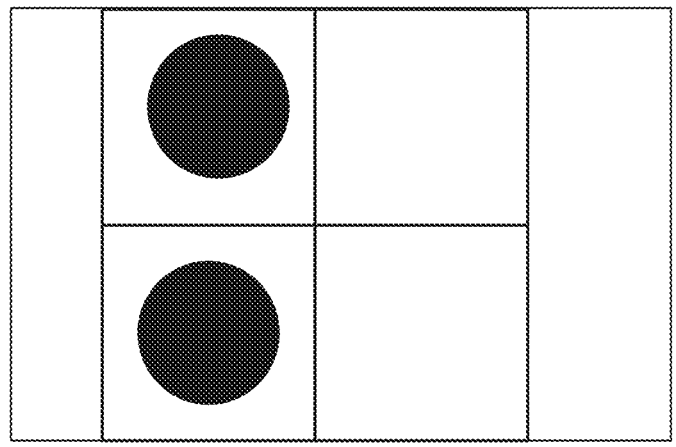

In a circuit structure shown in FIG. 15A, because the detectors are closely arranged on the image sensor 902, when a theoretical imaging position of a detection point is located at the edge of the detectors, an enlarged light spot is received by the plurality of detectors. Consequently, crosstalk is caused. Specifically, a dynamically-allocated SPAD array may be disposed on the image sensor 902. The dynamically-allocated SPAD array indicates that a position of the detector can move with a position of the light spot. (a) in FIG. 16 shows positions of the light spots and positions of the detectors in a state 1. In (a) in FIG. 16, black circles represent the light spots, and rectangular boxes outside the black circles represent the positions of the detectors. (b) in FIG. 16 is a schematic diagram of the positions of the detectors after the positions of the light spots move.

An interface may be disposed on the detector, and the controller (for example, an MCU) may control the location of the detector through the interface. For example, the controller may send a string of SPAD configuration commands to the detector through the interface, and the detector completes movement of the SPAD array based on the configuration commands.

It should be noted that SPADs and detectors are not in a one-to-one correspondence. For example, each detector includes 16 SPADs. At the first light spot moment, the first 16 SPADs (in rows 1 to 4) on the image sensor 902 form one detector, and at the second light spot moment, SPADs (in rows 2 to 5) on the image sensor 902 form a new detector.

Figure 17:
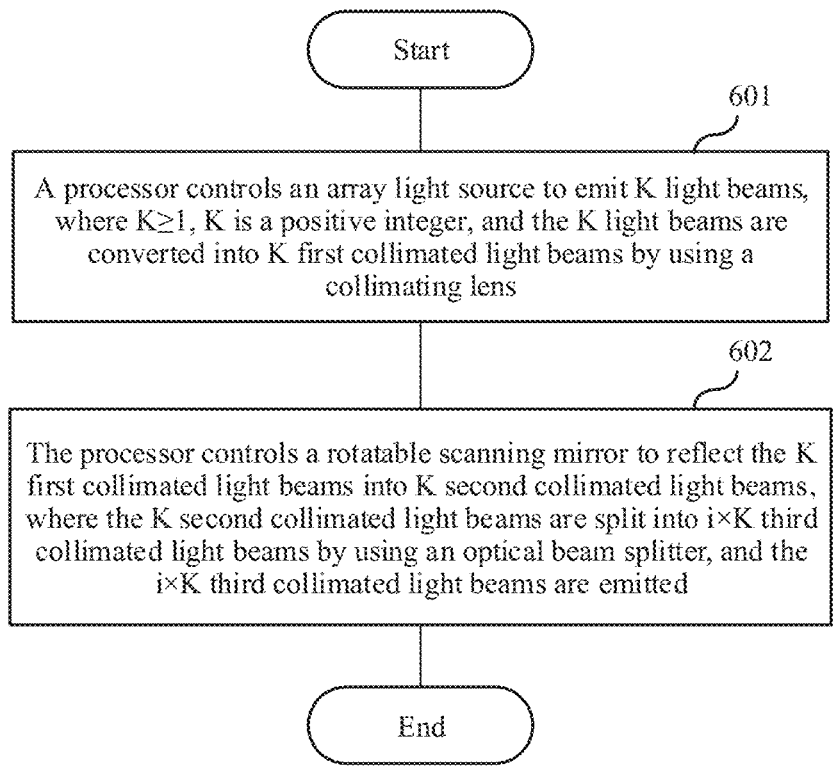
FIG. 17 is a flowchart of a light beam emitting method according to an embodiment of this application.

An embodiment of this application further provides a light beam emitting method. The method may be applied to the optical transmitting apparatus mentioned in the foregoing embodiment. Alternatively, the method may be further applied to the foregoing electronic device. FIG. 17 is a schematic flowchart of implementing the light beam emitting method. The method may include step 601 and step 602.

The optical transmitting apparatus includes an array light source, a collimating lens, a rotatable scanning mirror, an optical beam splitter, and a processor. The processor in the optical transmitting apparatus may perform the foregoing light beam emitting method.

Step 601: The processor controls the array light source to emit K light beams, where K≥1, K is a positive integer, and the K light beams are converted into K first collimated light beams by using the collimating lens.

The array light source is located on a first side of the collimating lens, a plane on which the array light source is located is perpendicular to an optical axis of the collimating lens, and a distance between the plane on which the array light source is located and a center point of the collimating lens is a focal length of the collimating lens. In this case, the K light beams emitted by the array light source may be propagated to the collimating lens. In addition, the rotatable scanning mirror is located on a second side of the collimating lens, and the optical axis of the collimating lens passes through a reflective surface of the rotatable scanning mirror. The K first collimated light beams converted from the light beams may be propagated to the rotatable scanning mirror.

Step 602: The processor controls the rotatable scanning mirror to reflect the K first collimated light beams into K second collimated light beams, where the K second collimated light beams are split into i×K third collimated light beams by using the optical beam splitter, and the i×K third collimated light beams are emitted.

It may be understood that when the rotatable scanning mirror rotates, propagation directions of the K second collimated light beams also change. Even if the rotatable scanning mirror rotates, the K second collimated light beams may be propagated to the optical beam splitter.

Figure 18:
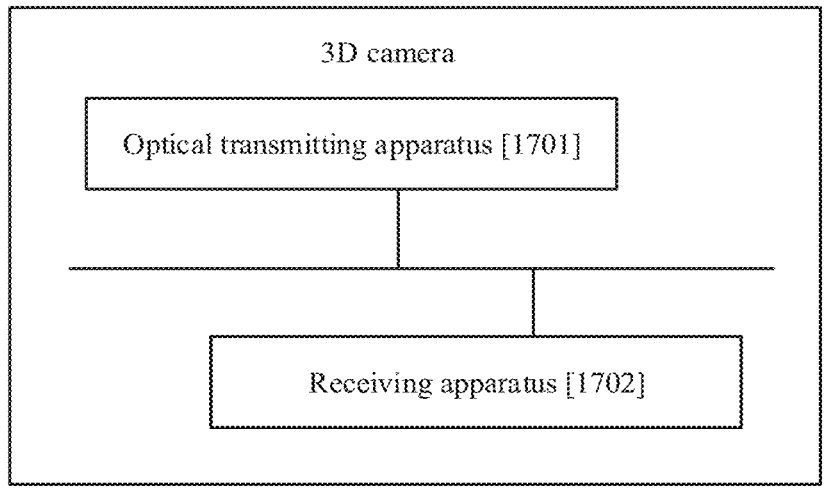
FIG. 18 is a schematic diagram of a structure of a 3D camera according to an embodiment of this application.

An embodiment of this application further provides a 3D camera. As shown in FIG. 18, the 3D camera includes an optical transmitting apparatus 1701 and a receiving apparatus 1702.

The 3D camera may further link various circuits such as a peripheral device, a processor, and a power management circuit. These are well known in the art, and therefore are not further described in this specification.

Figure 19:
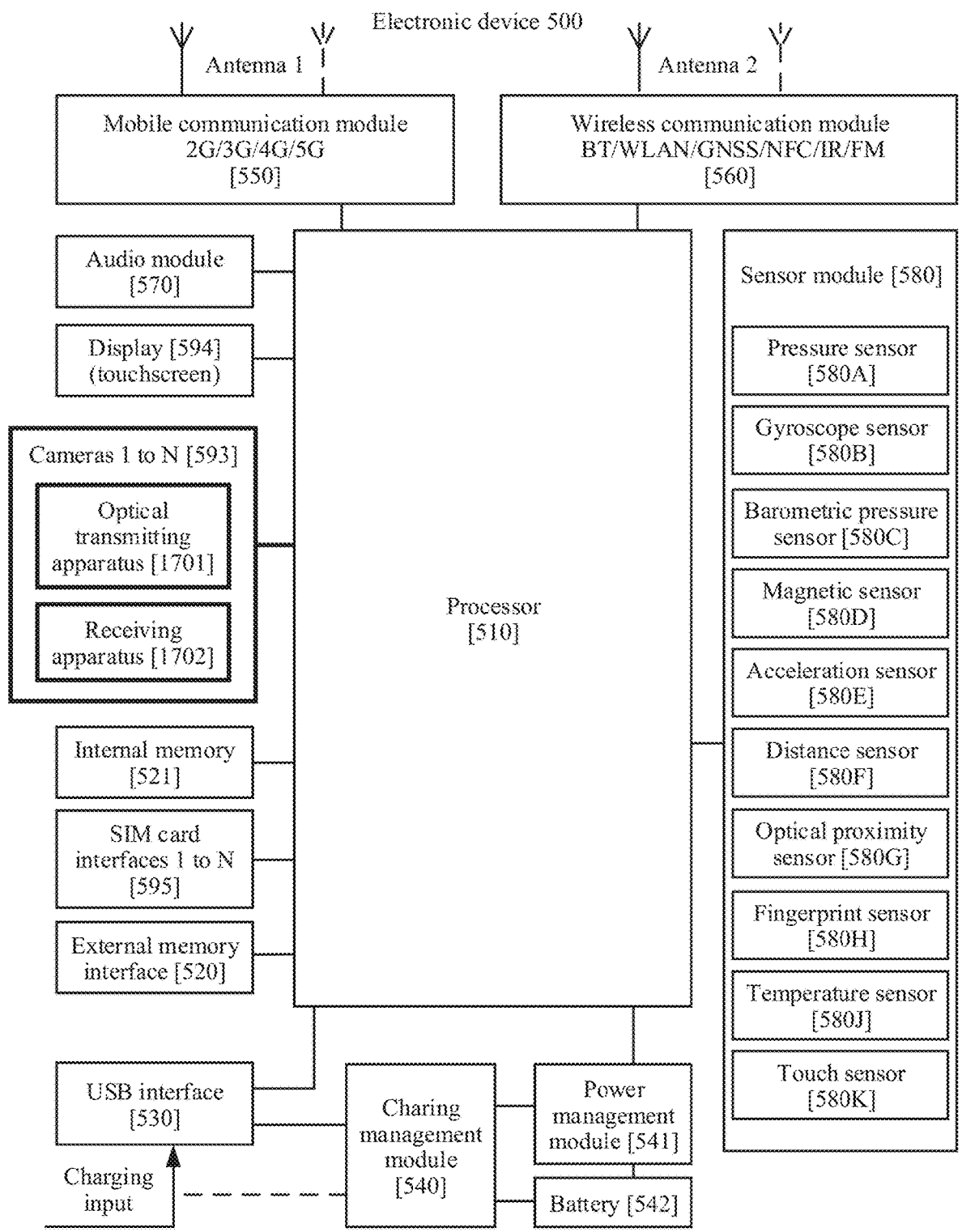
FIG. 19 is a schematic diagram of a structure of an electronic device according to an embodiment of this application.

An embodiment of this application further provides an electronic device. FIG. 19 is a schematic diagram of a structure of an electronic device 500 according to an embodiment of this application. As shown in FIG. 19, the electronic device 500 may include a processor 510, an external memory interface 520, an internal memory 521, a universal serial bus (universal serial bus. USB) interface 530, a charging management module 540, a power management module 541, a battery 542, an antenna 1, an antenna 2, a mobile communication module 550, a wireless communication module 560, an audio module 570, a sensor module 580, a camera 593, a display 594, a subscriber identity module (subscriber identity module, SIM) card interface 595, and the like. The sensor module 580 may include a pressure sensor 580A, a gyroscope sensor 580B, a barometric pressure sensor 580C, a magnetic sensor 580D, an acceleration sensor 580E, a distance sensor 580F, an optical proximity sensor 580G, a fingerprint sensor 580H, a temperature sensor 580J, a touch sensor 580K, and the like.

It may be understood that the structure shown in this embodiment of the present invention does not constitute a specific limitation on the electronic device 500. In some other embodiments of this application, the electronic device 500 may include more or fewer components than those shown in the figure, combine some components, split some components, or have different component arrangements. The components shown in the figure may be implemented by hardware, software, or a combination of software and hardware.

The processor 510 may include one or more processing units. For example, the processor 510 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 500. The controller may generate an operation control signal based on an instruction operation code and a time sequence signal, to complete control of instruction reading and instruction execution.

A memory may be further disposed in the processor 510, and is configured to store instructions and data. In some embodiments, the memory in the processor 510 is a cache. The memory may store instructions or data just used or cyclically used by the processor 510. If the processor 510 needs to use the instructions or the data again, the processor may directly invoke the instructions or the data from the memory. This avoids repeated access and reduces a waiting time of the processor 510, thereby improving system efficiency.

It may be understood that an interface connection relationship between the modules shown in this embodiment of the present invention is merely an example for description, and does not constitute a limitation on the structure of the electronic device 500. In some other embodiments of this application, the electronic device 500 may alternatively use an interface connection manner different from that in the foregoing embodiment, or a combination of a plurality of interface connection manners.

The charging management module 540 is configured to receive charging input from a charger. The charger may be a wireless charger or a wired charger.

The power management module 541 is configured to connect to the battery 542, the charging management module 540, and the processor 510. The power management module 541 receives input of the battery 542 and/or the charging management module 540, and supplies power to the processor 510, the internal memory 521, an external memory, the display 594, the camera 593, the wireless communication module 560, and the like. The power management module 541 may be further configured to monitor parameters such as a battery capacity, a battery cycle count, and a batten health status (electric leakage or impedance).

A wireless communication function of the electronic device 500 may be implemented by using the antenna 1, the antenna 2, the mobile communication module 550, the wireless communication module 560, the modem processor, the baseband processor, and the like.

The antenna 1 and the antenna 2 are configured to transmit and receive an electromagnetic wave signal. Each antenna in the electronic device 500 may be configured to cover one or more communication bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 550 may provide a wireless communication solution that includes 2G/3G/4G/5G or the like and that is applied to the electronic device 500. The mobile communication module 550 may include at least one filter, a switch, a power amplifier, a low noise amplifier (low noise amplifier, LNA), and the like.

The wireless communication module 560 may provide a wireless communication solution that is applied to the electronic device 500, and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 560 may be one or more components integrating at least one communication processor module. The wireless communication module 560 receives an electromagnetic wave through the antenna 2, performs frequency modulation and filtering processing on an electromagnetic wave signal, and sends a processed signal to the processor 510. The wireless communication module 560 may further receive a to-be-sent signal from the processor 510, perform frequency modulation and amplification on the signal, and convert the signal into an electromagnetic wave for radiation through the antenna 2.

The electronic device 500 implements a display function by using the GPU, the display 594, the application processor, and the like. The GPU is a microprocessor for image processing, and is connected to the display 594 and the application processor. The GPU is configured to: perform mathematical and geometric computation, and render an image. The processor 510 may include one or more GPUs that execute program instructions to generate or change display information.

The electronic device 500 may implement a photographing function by using the ISP, the camera 593, the video codec, the GPU, the display 594, the application processor, and the like.

The camera 593 may include the optical transmitting apparatus 1701 and the receiving apparatus 1702. The optical transmitting apparatus 1701 is configured to emit a light beam, and the light beam is projected onto a target object and reflected by the target object. The receiving apparatus 1702 is configured to receive a light beam reflected by the target object, and generate an image of the target object based on the collected light beam.

The ISP is configured to process data fed back by the camera 593. Fax example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 593.

The camera 593 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 500 may include one or N cameras 593, where N is a positive integer greater than 1.

The digital signal processor is configured to process a digital signal, and may process another digital signal in addition to the digital image signal. For example, when the electronic device 500 selects a frequency, the digital signal processor is configured to perform Fourier transformation on frequency energy.

The video codec is configured to compress or decompress a digital video. The electronic device 500 may support one or more video codecs. In this way, the electronic device 500 may play back or record videos in a plurality of coding formats, for example, moving picture experts group (moving picture experts group, MPEG)-1, MPEG-2, MPEG-3, and MPEG-4.

The external memory interface 520 may be configured to connect to an external storage card, for example, a micro SD card, to extend a storage capability of the electronic device 500. The external storage card communicates with the processor 510 through the external memory interface 520, to implement a data storage function. For example, files such as music and videos are stored in the external storage card.

The internal memory 521 may be configured to store computer-executable program code, where the executable-program code includes instructions. The processor 510 runs the instructions stored in the internal memory 521, to perform various functional applications of the electronic device 500 and data processing. The internal memory 521 may include a program storage area and a data storage area. The program storage area may store an operating system, an application required by at least one function (for example, a voice playing function or an image playing function), and the like.

The electronic device 500 may implement an audio function by using the audio module 570.

The pressure sensor 580A is configured to sense a pressure signal, and can convert the pressure signal into an electrical signal. In some embodiments, the pressure sensor 580A may be disposed on the display 594.

The gyroscope sensor 580B may be configured to determine a motion posture of the electronic device 500. In some embodiments, an angular velocity of the electronic device 500 around three axes (namely, axes x, y, and z) may be determined by using the gyroscope sensor 580B. The gyroscope sensor 580B may be configured to perform image stabilization during photographing.

The barometric pressure sensor 580C is configured to measure barometric pressure. In some embodiments, the electronic device 500 calculates an altitude based on the barometric pressure measured by the barometric pressure sensor 580C, to assist in positioning and navigation.

The magnetic sensor 580D includes a Hall sensor. The electronic device 500 may detect opening and closing of a flip cover by using the magnetic sensor 580D.

The acceleration sensor 580E may detect accelerations in various directions (usually on three axes) of the electronic device 500.

The distance sensor 580F is configured to measure a distance. The electronic device 500 may measure the distance in an infrared manner or a laser manner.

The optical proximity sensor 580G may include, for example, a light emitting diode (LED) and a light detector such as a photodiode. The light emitting diode may be an infrared light emitting diode. The electronic device 500 emits infrared light by using the light emitting diode. The electronic device 500 detects infrared reflected light from a nearby object by using the photodiode.

An ambient optical sensor 580L is configured to sense ambient light brightness.

The fingerprint sensor 580H is configured to collect a fingerprint. The electronic device 500 may use a feature of the collected fingerprint to implement fingerprint-based unlocking, application lock access, fingerprint-based photographing, fingerprint-based call answering, and the like.

The temperature sensor 580J is configured to detect a temperature. In some embodiments, the electronic device 500 executes a temperature processing policy based on the temperature detected by the temperature sensor 580J.

The touch sensor 580K is also referred to as a "touch panel". The touch sensor 580K may be disposed on the display 594, and the touch sensor 580K and the display 594 form a touchscreen, which is also referred to as a "touch screen".

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An optical transmitting apparatus, wherein a light beam emitted by the optical transmitting apparatus is irradiated on a target object and reflected by the target object, comprising: an array light source, a collimating lens, a rotatable scanning mirror, and an optical beam splitter, wherein
    the array light source comprises M×N light sources having M rows and N columns, wherein both M and N are positive integers, wherein a spacing between two adjacent columns of the light sources, a spacing between two adjacent rows of the light sources, and an included angle between a column of the light sources and a row of the light sources are predetermined;
    the array light source is configured to emit K light beams, K≥1, and K is a positive integer, wherein the array light source is located on a first side of the collimating lens, a plane on which the array light source is located is perpendicular to an optical axis of the collimating lens, and a distance between the plane on which the array light source is located and a center point of the collimating lens is a focal length of the collimating lens;
    the collimating lens is configured to convert the K light beams into K first collimated light beams;
    the rotatable scanning mirror is located on a second side of the collimating lens and configured to perform one-dimensional rotation, the optical axis of the collimating lens passes through a reflective surface of the rotatable scanning mirror, and the reflective surface is configured to reflect the K first collimated light beams into K second collimated light beams; and
    the optical beam splitter is configured to receive the K second collimated light beams and split each of the K second collimated light beams into i third collimated light beams corresponding to i points of the target object, wherein i≥2, and i is a positive integer, and wherein the array light source and optical beam splitter are configured such that one light beam from a single light source corresponds to i pixels in a generated image.

2. The optical transmitting apparatus according to claim 1, wherein
    the optical beam splitter comprises at least one of a one-dimensional grating, a two-dimensional diffractive optical element, and a prism film.

3. The optical transmitting apparatus according to claim 2, wherein the optical beam splitter is the one-dimensional grating configured to split one light beam into i light beams, wherein the i light beams have different propagation directions.

4. The optical transmitting apparatus according to claim 2, wherein the optical beam splitter is the prism film, an incident surface of the optical beam splitter is a plane, and an exit surface of the optical beam splitter is of a prism film structure; and wherein the prism film structure comprises i beam splitting surfaces configured to split one light beam into i light beams, and the i light beams have different propagation directions.

5. The optical transmitting apparatus according to claim 2, wherein the optical beam splitter is the two-dimensional diffractive optical element configured to split one light beam into a light beam matrix comprising i light beams.

6. The optical transmitting apparatus according to claim 1, wherein the included angle is an acute angle.

7. The optical transmitting apparatus according to claim 1, wherein the optical transmitting apparatus further comprises a controller connected to the rotatable scanning mirror;
the controller is configured to receive a control signal and transmit the control signal to the rotatable scanning mirror, wherein the control signal indicates the rotatable scanning mirror to adjust an angle of the reflective surface; and
the rotatable scanning mirror is configured to: (1) receive the control signal, and (2) adjust, based on the control signal, the angle of the reflective surface to adjust propagation directions of the K second collimated light beams.

8. The optical transmitting apparatus according to claim 7, wherein the rotatable scanning mirror comprises a micro-electro-mechanical systems (MEMS) reflector or a digital micromirror device DMD.

9. An electronic device, comprising:
an optical transmitting apparatus, wherein a light beam emitted by the optical transmitting apparatus is irradiated on a target object and reflected by the target object; and
a receiving apparatus, configured to receive a light beam reflected by the target object,
wherein the optical transmitting apparatus comprises: an array light source, a collimating lens, a rotatable scanning mirror, and an optical beam splitter, wherein
the array light source comprises M×N light sources having M rows and N columns, wherein both M and N are positive integers, wherein a spacing between two adjacent columns of the light sources, a spacing between two adjacent rows of the light sources, and an included angle between a column of the light sources and a row of the light sources are predetermined;
the array light source is configured to emit K light beams, K≥1, and K is a positive integer, wherein the array light source is located on a first side of the collimating lens, a plane on which the array light source is located is perpendicular to an optical axis of the collimating lens, and a distance between the plane on which the array light source is located and a center point of the collimating lens is a focal length of the collimating lens;
the collimating lens is configured to convert the K light beams into K first collimated light beams;
the rotatable scanning mirror is located on a second side of the collimating lens and configured to perform one-dimensional rotation, the optical axis of the collimating lens passes through a reflective surface of the rotatable scanning mirror, and the reflective surface is configured to reflect the K first collimated light beams into K second collimated light beams; and
the optical beam splitter is configured to receive the K second collimated light beams and split each of the K second collimated light beams into i third collimated light beams corresponding to i points of the target object, wherein i≥2, and i is a positive integer, and wherein the array light source and optical beam splitter are configured such that one light beam from a single light source corresponds to i pixels in a generated image.

10. The electronic device according to claim 9, wherein the optical beam splitter comprises at least one of a one-dimensional grating, a two-dimensional diffractive optical element, and a prism film.

11. The electronic device according to claim 9, wherein the included angle is an acute angle.

12. The electronic device according to claim 10, wherein the optical beam splitter is the one-dimensional grating configured to split one light beam into i light beams, wherein the i light beams have different propagation directions.

13. The electronic device according to claim 10, wherein the optical beam splitter is the prism film, an incident surface of the optical beam splitter is a plane, and an exit surface of the optical beam splitter is of a prism film structure; and wherein
the prism film structure comprises i beam splitting surfaces configured to split one light beam into i light beams, and the i light beams have different propagation directions.

14. The electronic device according to claim 10, wherein the optical beam splitter is the two-dimensional diffractive optical element; and
configured to split one light beam into a light beam matrix comprising i light beams.

15. The electronic device according to claim 9, wherein the optical transmitting apparatus further comprises a controller connected to the rotatable scanning mirror;
the controller is configured to receive a control signal and transmit the control signal to the rotatable scanning mirror, wherein the control signal indicates the rotatable scanning mirror to adjust an angle of the reflective surface; and
the rotatable scanning mirror is configured to: (1) receive the control signal, and (2) adjust, based on the control signal, the angle of the reflective surface to adjust propagation directions of the K second collimated light beams.

16. The electronic device according to claim 9, wherein the receiving apparatus comprises a receiving lens and an image sensor, and an optical axis of the receiving lens is perpendicular to a plane on which the image sensor is located;
the receiving lens is configured to receive the light beam reflected by the target object and refract the light beam reflected by the target object into a refracted light beam; and
the refracted light beam is irradiated on the image sensor, so that the target object is imaged on the image sensor.

17. The electronic device according to claim 16, wherein a distance between the image sensor and the receiving lens is less than twice a focal length of the receiving lens.

18. The electronic device according to claim 16, wherein a pixel of the image sensor is E×F, wherein E and F are positive integers; and
the image sensor comprises j detectors, wherein j is a positive integer less than E×F.

19. The electronic device of claim 18, wherein each of the j detectors comprises at least one single-photon detector.

20. The electronic device according to claim 16, wherein the receiving apparatus further comprises an optical filter;
the optical filter is disposed between the receiving lens and the image sensor, and the optical filter is parallel to the plane on which the image sensor is located; and the optical filter is configured to filter out ambient light in the refracted light beam.

* * * * *